United States Patent [19]
Rao

[11] Patent Number: 5,506,844
[45] Date of Patent: Apr. 9, 1996

[54] METHOD FOR CONFIGURING A STATISTICAL MULTIPLEXER TO DYNAMICALLY ALLOCATE COMMUNICATION CHANNEL BANDWIDTH

[75] Inventor: R. Padmanabha Rao, Sunnyvale, Calif.

[73] Assignee: Compression Labs, Inc., San Jose, Calif.

[21] Appl. No.: 246,442

[22] Filed: May 20, 1994

[51] Int. Cl.$^6$ ........................................... H04J 3/22
[52] U.S. Cl. ............................. 370/84; 370/94.1; 370/112
[58] Field of Search ............................ 370/56, 60, 60.1, 370/80, 84, 94.1, 94.2, 112, 118; 328/104, 154; 307/243; 327/407

[56] References Cited

U.S. PATENT DOCUMENTS

| | | | |
|---|---|---|---|
| 3,864,524 | 2/1975 | Walker | 370/84 |
| 4,751,699 | 6/1988 | Tarridec et al. | 370/84 |
| 5,291,486 | 3/1994 | Koyanagi | 370/84 |
| 5,363,370 | 11/1994 | Abiven | 370/112 |
| 5,381,412 | 1/1995 | Otani | 370/112 |

*Primary Examiner*—Hassan Kizou
*Attorney, Agent, or Firm*—Skjerven, Morrill, MacPherson, Franklin & Friel

[57] ABSTRACT

A statistical multiplexer selectively passes packets of encoded data from a plurality of encoders to a communication channel so as to maximize the quality of the encoded data. The statistical multiplexer determines what fraction of the communication channel capacity should be allocated to an application so as to optimize the quality of the decoded signals of the applications processed by the statistical multiplexer. A table is stored in a memory of the statistical multiplexer that has an entry for each unit of encoded data that can be transmitted over the communication channel in a predetermined time interval. The statistical multiplexer accesses each entry in the table to obtain a pointer, e.g., an address, to an encoder that can transmit the next unit of encoded data to the communication channel. The statistical multiplexer dynamically adjusts the data compression rate for each variable rate application so that the quality of all the encoded data streams are optimized over a window, and builds a new table that reflects the adjusted rates. In one application, the table is broken into a static table and a dynamic table. The static table is built at configuration time and while one dynamic table is being used for a window, a new dynamic table is built for the next window.

31 Claims, 15 Drawing Sheets

METHOD FOR CONFIGURING A STATISTICAL MULTIPLEXER TO DYNAMICALLY ALLOCATE COMMUNICATION CHANNEL BANDWIDTH

FIELD OF THE INVENTION

This invention relates generally to selecting data for transmission over a communication channel and more particularly to a multiplexer that allocates the bandwidth of a communication channel to a plurality of data streams so as to maintain the quality of the transmitted data within a selected range, or alternatively to maximize the quality across the data streams.

BACKGROUND OF THE INVENTION

Video data typically includes luminance and chrominance data for each pixel in a frame. Raw digital video data contains too much information for transmission over normal communication media and requires considerable storage capacity. Consequently, to utilize either the limited bandwidth of the communication media, or storage capacity efficiently, coding techniques are commonly used to compress the information contained in the raw video data.

For example, in FIG. 1, video camera 101 generates an analog video signal that drives input processor 102. Input processor 102 digitizes and typically filters the analog video signal to produce a raw digital video signal. The raw digital video signal is encoded, i.e., compressed, by encoder 103. The compressed digital video signal is transmitted over a communication channel, for example, a satellite link, to a decoding system 120 that includes a decoder 121, a post-processor 122, and a display driver 123. Decoder 121 decompresses the encoded video data and supplies the resulting signal to post-processor 122, which in turn smooths and enhances the video signal. The video signal from post-processor 122 supplies display driver 123 that drives display unit 130. The encoding, i.e., compression, of video signals for storage or transmission and the subsequent decoding is well-known.

Typically, multiple applications are sharing access to a communication channel rather than just a single application, i.e., video camera 101 as illustrated in FIG. 1. For example, in FIG. 2, "L" applications 201-1 to 201-L are compressed using encoders 202-1 to 202-L, respectively. Applications 201-1 to 201-L can be from a variety of signal sources, e.g., video, audio, etc.

Each application 201-1 to 201-L drives an encoder 202-1 to 202-L, respectively. Typically, for a video input signal a compression loop 204-1 within encoder 201-1, for example, performs prediction and quantization as the main operations. As each picture of a video signal is compressed by compression loop 204-1, bits of compressed data are written to buffer 205-1. A controller (not shown) manages rate control of the compression to prevent buffer 205-1 from overflowing and underflowing. The video encoder rate control ensures that encoder 201-1 produces bits of encoded data at an approximately constant rate over some interval of time from buffer 205-1 while maximizing the picture quality of the video sequence.

Applications 201-1 to 201-L are either fixed rate or variable rate applications. A fixed rate application 201-i releases bits to channel 230 at a constant rate. A variable rate application 202-i releases bits to channel 230 over a non-constant rate, i.e., the rate may change with time.

The output data from encoders 202-1 to 202-L are each an input data stream to multiplexer 210. The data stream passed through multiplexer 210 is determined by a multiplexer controller circuit 211 that receives input signals from a system controller 250. System controller 250 is typically a computer that is programmed to pass signals to multiplexer control circuit 211 so that encoded data are passed through multiplexer 210 in manner that is independent of the content of the transmitted signal or the quality of the resulting image.

Transfer of information from encoders 202-1 to 202-L to the multiplexer 210 and subsequently to the communication channel usually is done in packets of information. Multiplexer 210 passes therethrough to communication channel 220 a packet of data at a time from one of applications 201-1 to 201-L. The number of packets transferred from an application 201-i to communication channel 220 averaged over some interval of time, say a second, equals the rate allocated to that particular application. Note that it is not necessary that the transfer of information be packet based.

SUMMARY OF THE INVENTION

According to the principles of this invention, a statistical multiplexer dynamically distributes the total capacity of a communication channel among a plurality of data streams that compete for access to the communication channel. At the same time, the statistical multiplexer assures that the communication channel capacity is not exceeded. In other words, the statistical multiplexer of this invention determines what fraction of the communication channel capacity should be allocated for any interval of time to a particular data stream, i.e., an application, so as to maximize the quality of the signals of all applications transmitted over the communication channel.

Further, the statistical multiplexer changes the fraction of the communication channel capacity allocated to the various data streams in real time so as to maximize the quality of the signals for all the data streams that are transmitted over the communication channel. The statistical multiplexer operates as an outer shell over the rate control mechanism of the hardware that provides each of the data streams to the statistical multiplexer. The statistical multiplexer generates and provides, at least once during each statistical multiplexer period, new rates to those control mechanisms so as to maintain a selected parameter for each application within a predetermined range.

In one embodiment, the statistical multiplexer implements a statistical multiplexing process for a plurality of data streams competing for access to a communication channel that creates and populates a static table in a memory of the statistical multiplexer. The static table has an entry for each unit of data that can be sent over the communication channel in a predetermined time period.

In the population of the static table, that is sometimes called a primary table, the statistical multiplexer allocates each entry in the static table to one of the plurality of data streams. If an entry is allocated to a data stream that has a variable rate, the statistical multiplexer stores a predetermined code, such as a null code, in the entry. Conversely, if the entry is allocated to a data stream that has a fixed rate, the statistical multiplexer stores a pointer to the fixed rate data stream in the entry. The pointer identifies the fixed rate data stream and is, in one embodiment, an address for the hardware that generates the fixed rate data stream. Each entry in the static table is either a pointer to a fixed rate data stream or the predetermined code.

The statistical multiplexer uses the static table to allocate the communication channel capacity among the plurality of data streams competing for access to the communication channel. Specifically, the statistical multiplexer accesses an entry in the static table to determine the data stream in the plurality of data streams that sends the next unit of data to the communication channel during the predetermined time period.

In addition to the static table, the statistical multiplexer also generates and populates a dynamic table, that is sometimes called a secondary table. In populating the dynamic table, the statistical multiplexer allocates each entry in the dynamic table, in this embodiment, to one of a variable rate data stream and an idle unit of data. Of course, the idle units of data could be considered as just another variable rate data stream, that transmits idle data over the communication channel. If an entry is allocated to a variable rate data stream, the statistical multiplexer stores a pointer to the variable rate data stream in the entry. The pointer identifies the variable rate data stream and is, in one embodiment, an address for the hardware that generates the variable rate data stream. Each entry in the dynamic table is a pointer to either a variable rate data stream or an idle unit of data.

In determining the application that can access the communication channel to transmit the next unit of data, the statistical multiplexer accesses an entry in the dynamic table upon detecting an entry in the static table containing the predetermined code. The accessed entry determines the variable rate data stream in the plurality of data streams that sends the next unit of data to the communication channel.

While the statistical multiplexer is using the static and dynamic tables to allocate the communication channel bandwidth to the various data steams competing for access to the communication channel, the statistical multiplexer is also adjusting a number of units of data, e.g., a number of packets, allocated for transmission over the communication channel for each of the variable rate data streams that has a quality measurement parameter outside a predetermined range. Specifically, the statistical multiplexer is generating new rates for selected variable rate data streams.

The statistical multiplexer generates a second dynamic table using the adjusted number of units of data allocated for transmission over the communication channel. The process used to generate the second dynamic table is the same as that used for the first dynamic table, except the new rates are used where necessary.

Specifically, the statistical multiplexer allocates each entry in the second dynamic table, in this embodiment, to one of a variable rate data stream and an idle unit of data. If an entry is allocated to a variable rate data stream, the statistical multiplexer stores a pointer to the variable rate data stream in the entry. Each entry in the second dynamic table is a pointer to either a variable rate data stream or an idle unit of data. After a selected timed interval, e.g., in this embodiment, at about the end of a statistical multiplexer cycle, the statistical multiplexer switches from the first dynamic table to the second dynamic table.

To determine how to adjust the rates used in populating the dynamic table, the statistical multiplexer collects data for each variable rate data stream that characterizes a quality of the variable rate data stream. The statistical multiplexer uses the collected data to generate a parameter that characterizes the quality of the variable rate data stream. In one embodiment, the parameter is a measure of distortion and the predefined range has a lower limit that is a product of a first hysteresis coefficient and a distortion threshold. An upper limit of the predetermined range is a product of a second hysteresis coefficient and a distortion threshold.

The statistical multiplexing process of this invention is applicable to a wide variety of data streams. In this embodiment, the plurality of data streams includes an encoded video data stream.

In another embodiment of this invention a statistical multiplexing process for a plurality of encoded data streams competing for access to a communication channel includes the steps of:

assigning a rate to each encoder that generates one of the plurality of encoded data streams wherein the encoders include fixed and variable rate encoders;

populating a primary table having a predetermined number of entries using the assigned rates
wherein each entry in the primary table is allocated to one
of (i) one of the plurality of encoded data streams and
(ii) an idle packet; and
using each table entry in the primary table to select an encoded data stream in the plurality of encoded data streams that sends the next packet to the communication channel.

In yet another embodiment of this invention, a statistical multiplexing process for a plurality of encoded data streams competing for access to a communication channel includes the steps of:

collecting data for each variable rate encoded data stream from a variable rate encoder in said plurality of encoded data streams to generate a distortion parameter that characterizes said variable rate encoded data stream;

generating for each variable rate encoded data stream said distortion parameter that characterizes a quality of said variable rate encoded data stream;

adjusting a number of packets allocated to each of said variable rate encoded data streams in a selected time period if said distortion parameter is outside a predetermined range;

populating a table using said adjusted number of allocated packets wherein said table populating step further comprises:

i) allocating an entry in said table to one of A) a variable rate encoded data stream in a plurality of variable rate encoded data streams that are included in said plurality of encoded data streams and B) an idle packet;

ii) storing in said entry a pointer to said variable rate encoded data stream upon said entry being allocated to said variable rate encoded data stream; and iii) repeating steps i) to ii) for each entry in said table;

switching to said table so that said table is used by a statistical multiplexer to determine the variable rate encoded data stream that sends the next packet to a communication channel.

DETAILED DESCRIPTION OF THE INVENTION

Figure 1:
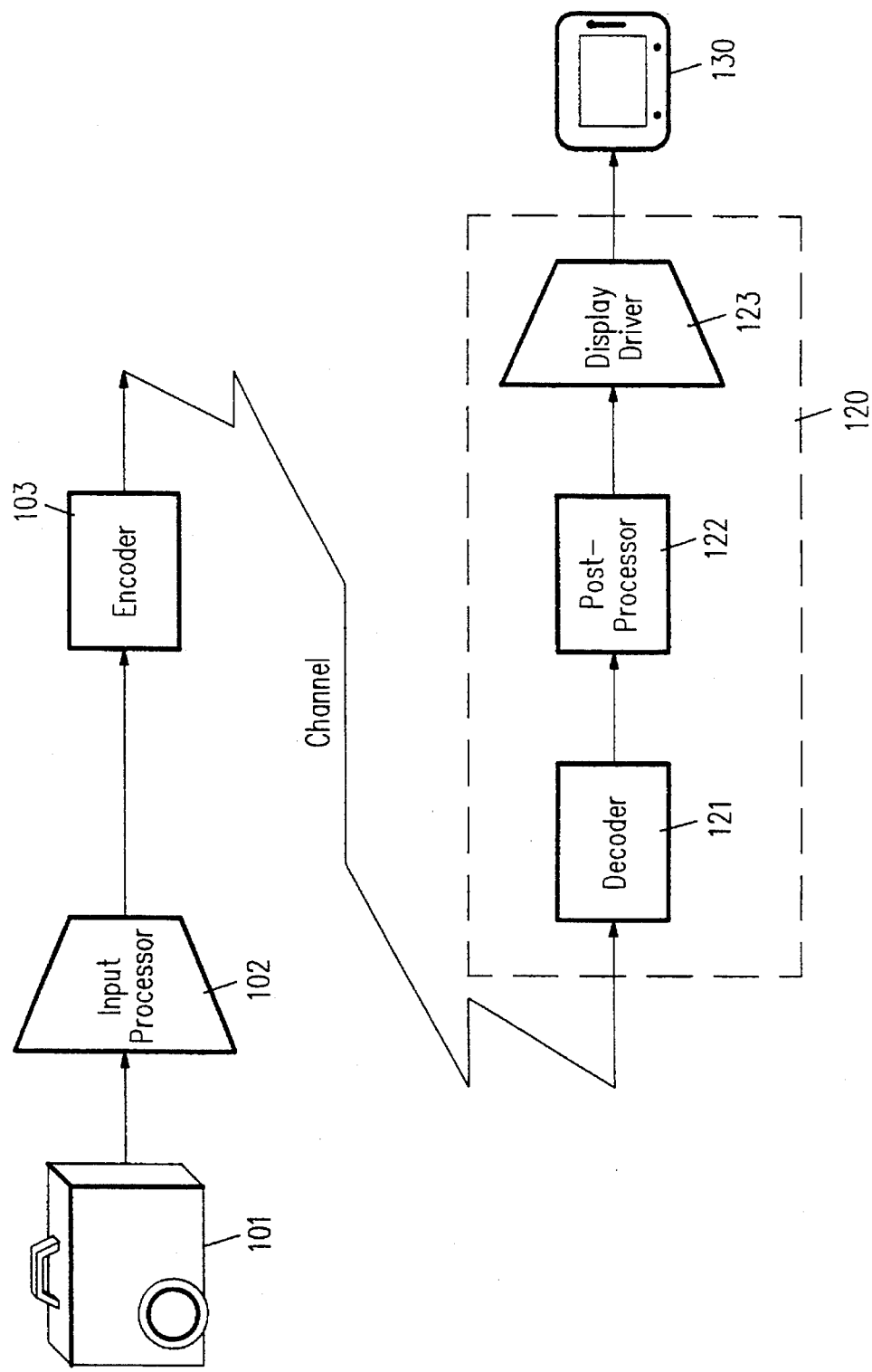
FIG. 1 is a block diagram of a prior art encoding and decoding system.
Figure 2:
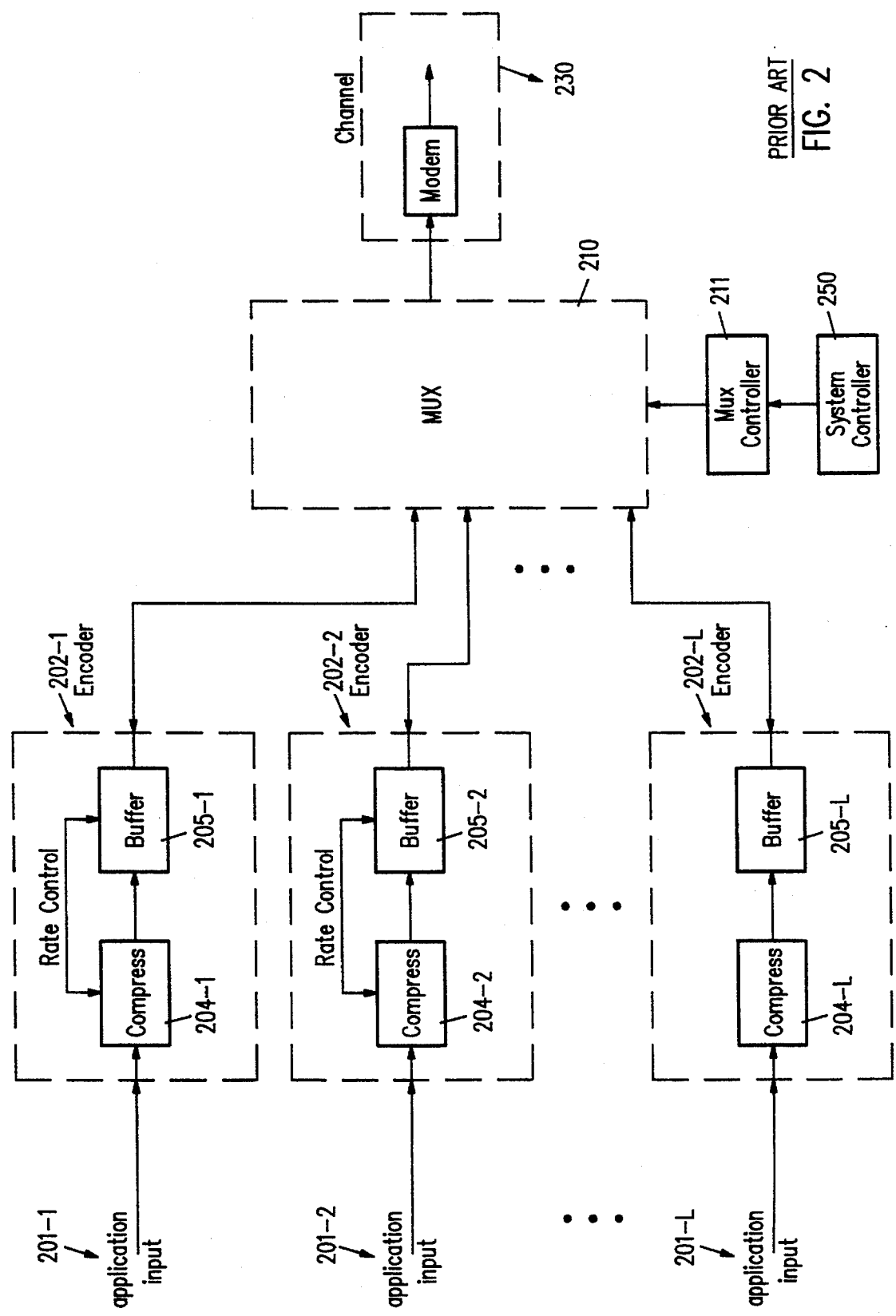
FIG. 2 is a block diagram of a prior art system using a multiplexer for access to a communication channel.

According to the principles of this invention, a statistical multiplexer 300 selectively passes packets of encoded data from encoders 302-1 to 302-L to communication channel 330 so as to maximize the quality of the encoded data representing each of applications 301-1 to 301-L. The encoded data in the form of packets, in this embodiment, is transmitted over communication channel 330 to a decoding system (not shown) which in turn decodes the data. Further, while below video data is used as an example of the principles of this invention, those skilled in the art will recognize that the principles of the invention can also be applied to other signal sources that are transmitted over a communication channel.

Herein, an application 301-i is encoded by encoder 302-i, where "i" ranges from 1 to L. A reference to application 301-i should be interpreted as including a reference to encoder 302-i that receives as an input signal application 301-i. Also, when the phrase, variable rate, is used to modify an application, an encoder, or an encoded data stream, it means that the encoder, that receives the application as input and generates an encoded data stream, can change the rate of data compression over time. Conversely, when the phrase, fixed rate, is used to modify an application, an encoder, or an encoded data stream, it means that the encoder, that receives the application as input and generates an encoded data stream, does not change the rate of data compression except at configuration time.

Statistical multiplexer 300 of this invention distributes the total capacity of communication channel 330 over some interval of time among the plurality of encoded data streams for all applications 301-1 to 301-L so that the quality of applications 301-1 to 301-L is maximized. At the same time, statistical multiplexer 300 assures that the communication channel capacity is not exceeded. In other words, statistical multiplexer 300 of this invention determines what fraction of the communication channel capacity should be allocated to an application 301-i so as to maximize the quality of the decoded signals of all applications.

Specifically, a table is stored in memory 313 of controller 310. The table has an entry for each unit of encoded data that can be transmitted over communication channel 330 in a predetermined time interval, e.g., one second. Each entry in the table is allocated, as explained more completely below, to one of encoders 302-1 to 302-L, i.e, to an encoded data stream from encoder 302-i. More entries are allocated for an encoder 302-i that has a high encoding rate than for an encoder 302-j that has a slower encoding rate. Thus, the entries in the table define the number of units of data that are transmitted over communication channel 330 in the predetermined time interval for each of encoders 302-1 to 302-L.

In each predetermined time interval, controller 310 accesses each entry in the table to obtain a pointer, e.g., an address, to an encoder 302-i that can transmit the next unit of encoded data to first-in-first-out memory (FIFO) 350 over application control bus 360. As one unit of encoded data is loaded into FIFO 350, another unit of encoded data is passed from FIFO 350 to communication channel 330. Controller 310, in this embodiment, moves sequentially through the entries in the table stored in memory 313 and so allocates the bandwidth of communication channel 330 to encoders 302-1 to 302-L in a predetermined sequence over the predetermined time interval.

According to the principles of this invention, statistical multiplexer 300 dynamically adjusts the data compression rate for each variable rate application 301-i over a selected interval of time that is referred to as a window, so that the quality of the encoded data streams is maximized over the selected time interval. Each fixed rate application 301-i receives an allocated quota of packets, i.e., a fraction of the communication channel bandwidth over the selected time interval.

Typically, the number of variable rate applications is less than the total number of applications L. Statistical multiplexer 300 adjusts the data compression rate, sometimes referred to simply as "rate" to maintain a measure of distortion, as defined more completely below, for each variable rate application 301-i below a predetermined limit. Thus, statistical multiplexer 300 operates as an outer shell over the video encoder rate control mechanism by providing rates to that control mechanism so as to maintain a selected parameter for each variable rate application 301-i within a predetermined range.

While controller 310 is stepping through the table stored in memory 313 to select packets, e.g., units of encoded data, from encoder 302-1 to 302-L for transmission over communication channel 330, controller 310 is also collecting and storing data in memory 313 from each variable rate encoder 302-i. Controller 310 analyzes the collected data and adjusts the compression rate for each variable rate encoder 302-i to maximize the quality for all encoders.

The new compression rates are used to build a new table that is used over the next window. A window is defined more completely below. Hence, controller 310 is selecting packets from encoders 302-1 to 302-L for transmission to communication channel 330 and at the same time is generating a new table of compression rates. When the new table is complete, the new compression rates are transmitted to encoders 302-i that are processing variable rate applications. At about the end of the window, encoders 302-i that are processing variable rate applications shift to the new compression rates and then statistical multiplexer 300 shifts to the new table. Specifically, statistical multiplexer 300 switches to the new table.

In an embodiment that is described below, the table utilized by statistical multiplexer 300 to allocate each unit of data that can be transmitted over communication channel 330 over the window is in fact two tables, a static table and a dynamic table. The static table has an entry for each unit of encoded data that can be transmitted over communication channel 330 in the predetermined time interval.

At configuration time, the static table is populated. Specifically, the entries in the static table are allocated to the fixed rate and variable rate applications, i.e, each entry is allocated to one of a plurality of data streams. For each entry that is allocated to a fixed rate data stream from a fixed rate encoder, a pointer is stored in the entry to the fixed rate data stream. For each entry that is allocated to a variable rate data stream, a predetermined code, e.g., a null code is stored in the entry.

The dynamic table is populated with pointers to variable rate applications. Specifically, each entry in the dynamic table is allocated to one of the variable rate applications, i.e., to a variable rate encoded data stream from a variable rate application, or to an idle packet. In each entry that is allocated to a variable rate application, a pointer is stored to that variable rate application. When statistical multiplexer 300 accesses the predetermined code in the static table, the next entry in the dynamic table is used to determine the variable rate encoder that sends the next unit of data to communication channel 330.

Figure 3:
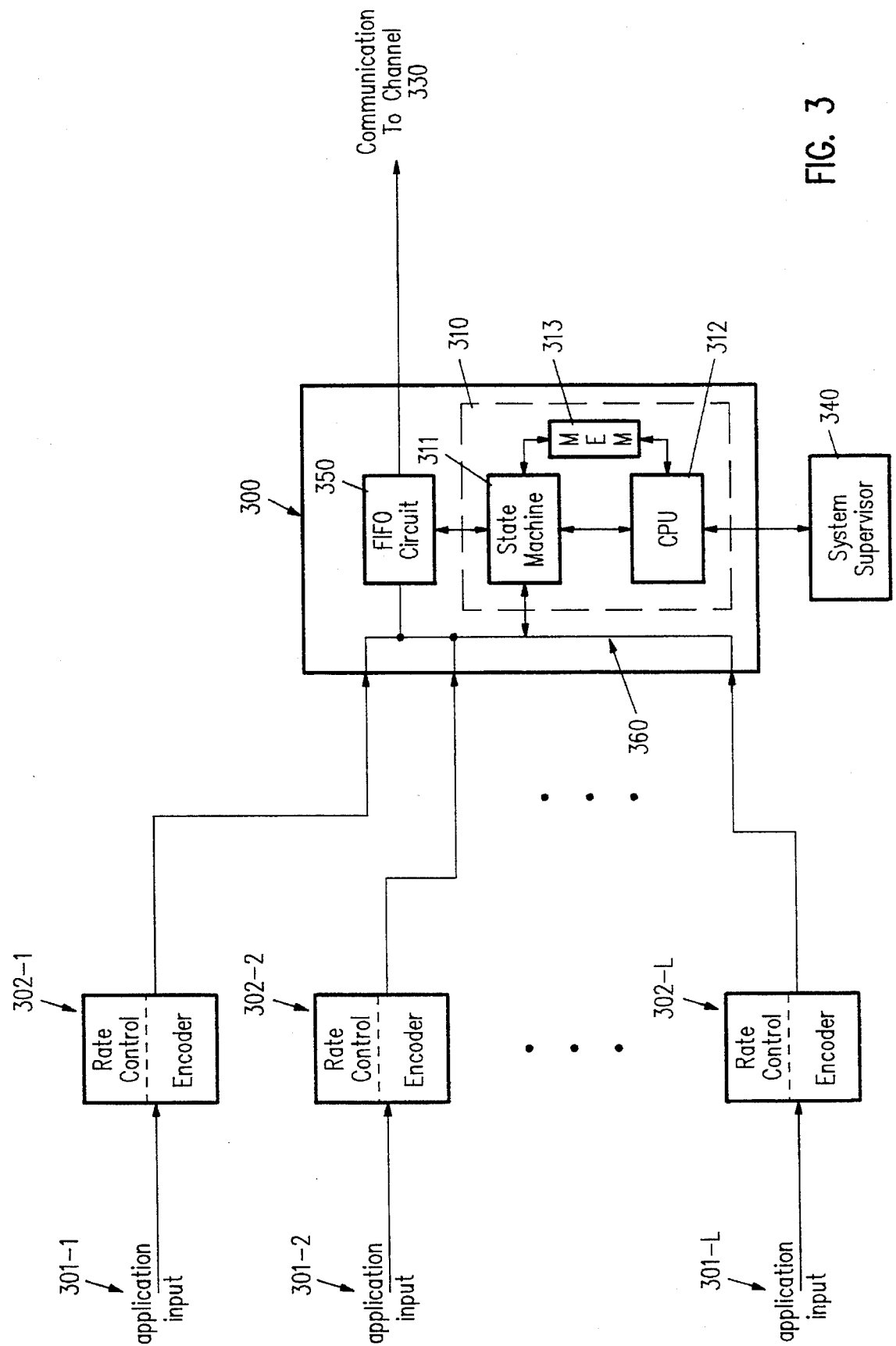
FIG. 3 is a block diagram of the statistical multiplexer of this invention.
Figure 4:
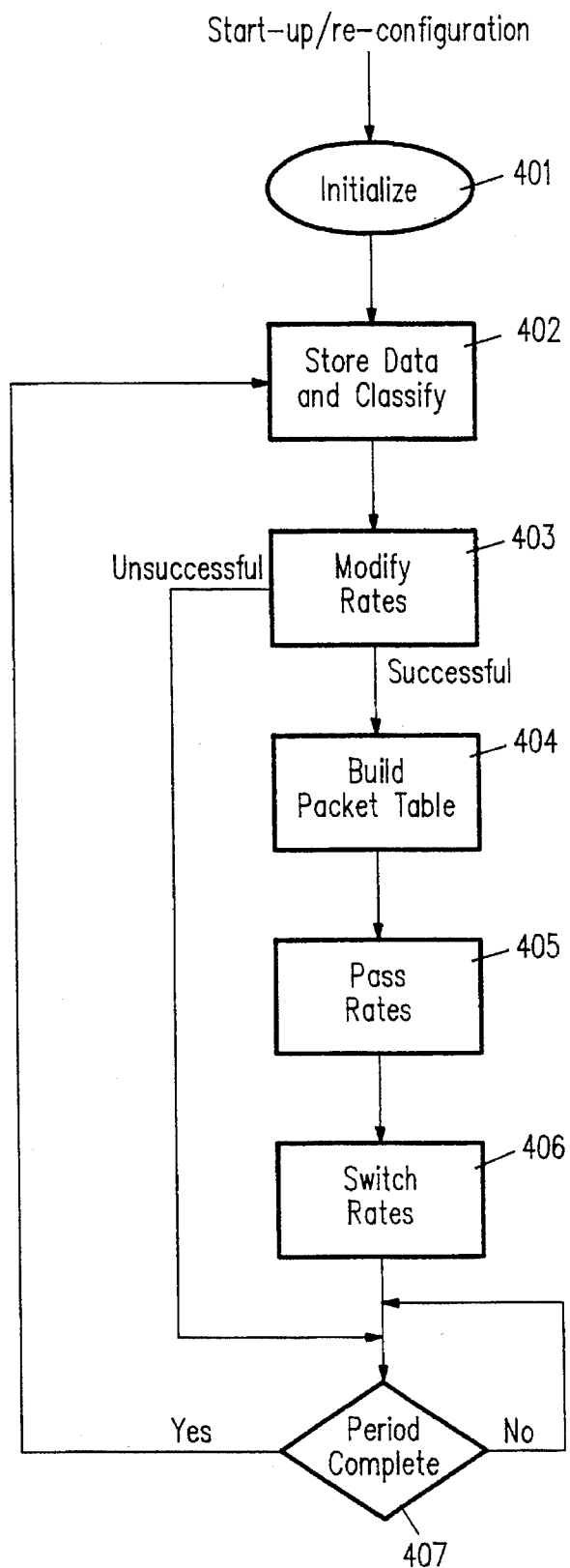
FIG. 4 is a process flow diagram for rate update operations of the statistical multiplexer of this invention within each statistical multiplexer period.
Figure 5:
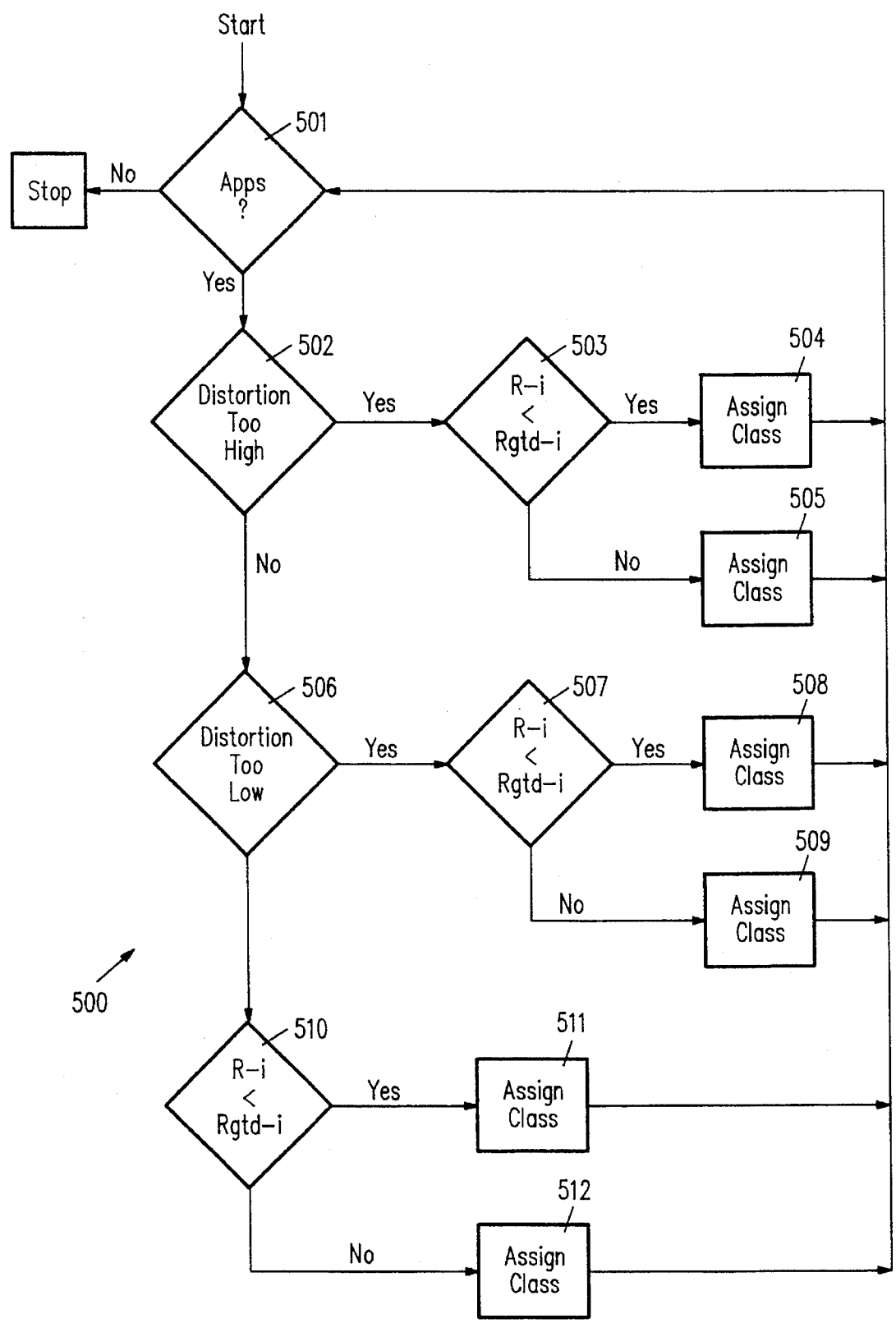
FIG. 5 is a process flow diagram for classifying applications within step 402 of FIG. 4 according to the principles of this invention.
Figure 6:
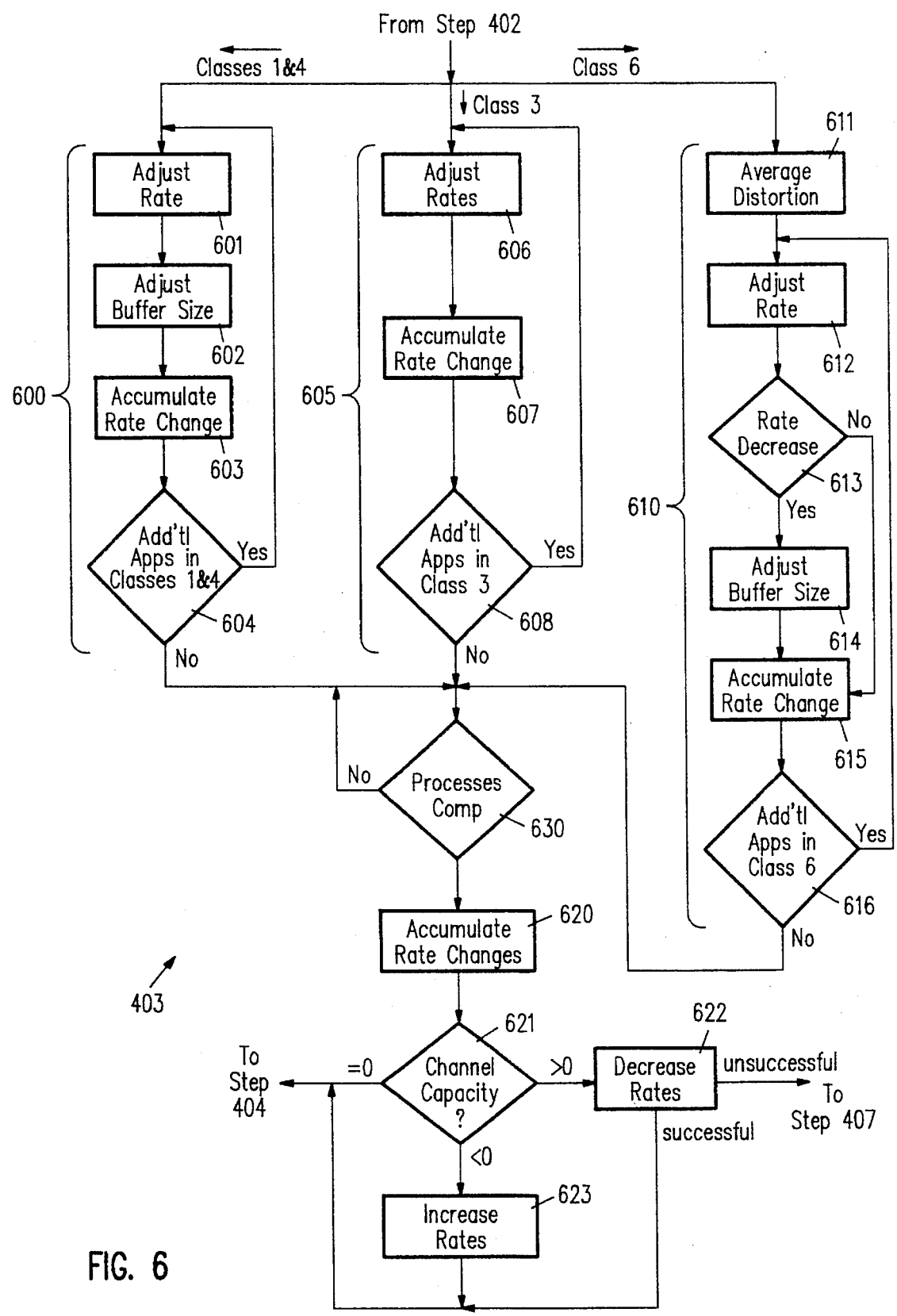
FIG. 6 is a more detailed flow process diagram of step modify rates 403 of FIG. 4 according to the principles of this invention.

FIG. 4 is a process flow diagram for statistical multiplexer 300. Upon start-up, i.e., at initial configuration and at reconfiguration, statistical multiplexer 300 enters initialization step 401. In initialization step 401, system supervisor 340 (FIG. 3) provides configuration information for use in subsequent operation of statistical multiplexer 300. The configuration information is stored in memory 313. As explained more completely below, in this embodiment, the stored configuration information includes a minimum data rate Rmin_i, a maximum data rate Rmax_i and a guaranteed data rate Rgtd_i, a maximum buffer size Bmax_i, a maximum distortion coefficient Dmax_i, a priority number P_i, and distortion hysteresis coefficients K1_i and K2_i for each encoder 302-i. The rates provided by system supervisor 340 are converted, if necessary, to units that are compatible with statistical multiplexer 300.

In step 401, all encoders 302-1 to 302-L are assigned their nominal rates. In the case of fixed rate applications, the nominal rate is the actual rate. In the case of statistically multiplexed applications, i.e., variable rate applications 301-i, the nominal rate is either the guaranteed rate, or some other pre-defined value, such as the minimum rate. In this embodiment, each variable rate encoder 302-i is assigned guaranteed data rate Rgtd_i as initial rate R_i for application 301-i. Similarly, a distortion D_i for each variable rate encoder 302-i is set to maximum distortion coefficient Dmax_i.

Upon completion of initialization step 401, processing transfers to collection and classification step 402. Collection and classification step 402 is also entered at the end of each statistical multiplexer period, sometimes called a statistical multiplexer cycle. Data required to determine an updated distortion D_i for each variable rate application 301-i is collected in step 402. As explained more completely below, distortion D_i involves a number of parameters that characterize the video sequence that is being processed by variable rate encoder 302-i. Distortion D_i itself may be provided to statistical multiplexer 300 by variable rate encoder 302-i or variable rate encoder 302-i can provide parameters to statistical multiplexer 300 so that statistical multiplexer 300 can determine distortion D_i for variable rate encoder 302-i.

In one embodiment, as described more completely below, statistical multiplexer 300 polls each variable rate encoder 302-i in a round robin fashion in a pre-defined sequence and reads one byte of information at a time from each variable rate encoder 302-i. Distortion D_i is determined once for each picture in the sequence by statistical multiplexer 300. Thus, the frequency of transferring the distortion parameters from variable rate encoder 302-i to statistical multiplexer 300 is once per picture. Consequently, the collection portion of step 402 is performed by statistical multiplexer 300 on an ongoing basis.

Statistical multiplexer 300 tracks the variation in buffer fullness of each variable rate encoder 302-i to ensure that there is no overflow or underflow whenever a rate is altered in step 402. The buffer fullness information is available in each variable rate encoder 302-i and is passed, once per picture, to statistical multiplexer 300.

Distortion D_i is determined by statistical multiplexer 300 for each variable rate application 301-i in step 402 based on distortion parameters that were obtained from variable rate encoder 302-i prior to initiation of step 402. Specifically, any new distortion information received in collection and classification step 402 while step 402 is active, is not effective until the next time step 402 becomes active. Thus, statistical multiplexer 300 uses data collected during the previous statistical multiplexing cycle in step 402.

The classification step in step 402 assigns each variable rate application 301-i to one of a plurality of classes. In one embodiment, the plurality of classes includes six classes. As explained more completely below, the classes are defined based on (i) whether rate R_i is less than, or greater than or equal to guaranteed rate Rgtd_i for variable rate encoder 302-i; and (ii) the relationship of distortion D_i to maximum distortion coefficient Dmax_i.

In modify rates step 403, a new rate for at least each non-fixed rate application is generated, as explained more completely below, for each encoder 302-i where a change in rate preferably either improves distortion D_i or does not increase distortion D_i to greater than a maximum distortion. For encoders with variable rate applications that are being compressed so as to achieve an acceptable distortion D_i, the new rate is simply set equal to the old rate. After a new rate is determined for each variable rate encoder 302-i, the new rates are checked to determine whether the total rate exceeds the capacity of communication channel 330. The new rates are adjusted so as to utilize as much of the capacity of communication channel 330 as possible without exceeding its capacity.

Upon completion of modify rates step 403, build table 404 builds a new table, as explained more completely below. In one embodiment, a unit of encoded data sent over communication channel 330 is referred to as a packet and so build table 404 builds a new packet schedule table. In statistical multiplexer 300, the rate requirements of different applications 301-i change rapidly with time, and consequently the quota of packets allocated to an application changes with time. Statistical multiplexer 300 ensures that each application 301-i gets its allocated quota of packets over a specified window of time in build table step 404.

The packet schedule table, that is built in step 404, is defined for the next statistical multiplexer cycle, i.e., a window, and contains information about which application is allocated each packet in that time interval. The allocation of packets is such that the packets belonging to any one application are approximately uniformly spread over the time interval. This minimizes any additional buffering in a demultiplexer in the decoding system. (The demultiplexer selects the packets in the stream of incoming data stream that are of interest to the decoding system.) The packet schedule table, based on the new rates allocated to each variable rate encoder 302-i in step 403, comes into effect at the start of the next window.

The smaller the window size, the more processing overhead per packet since the packet schedule table has to be built more frequently. On the other hand, a large window size reduces the reaction of statistical multiplexer 300 to changes in distortion, e.g., a scene change might cause a video sequence to become more complex. In such a case if rate $R\_i$ is low, the scene change results in distortion $D\_i$ becoming large and statistical multiplexer 300 should allocate more bits to encoder 302-i. However, if the window size is large, statistical multiplexer 300 fails to react promptly to the scene change unless the scene change fortuitously occurs near the end of the window. As used herein, a picture refers to a characteristic unit of the encoder. For most cases, a picture is a frame, but since this invention is not limited to acting only on frames, the more general term "picture" is used. In the case of non-video data, some other appropriate unit may be used, e.g., an audio frame.

When the new packet schedule table is built in step 404, statistical multiplexer 300 communicates each new rate to the respective variable rate encoder 302-i in pass rates step 405. Again, a pre-defined order can be used for this purpose. Finally, at some instant in switch rates step 406, variable rate encoders 302-i switch their internal rate control to the new rates. At the same time, statistical multiplexer 300 switches to the new packet schedule table built in step 404. Thus, synchronization between statistical multiplexer 300 and applications 301-1 to 301-L is maintained to ensure that the sum of all the encoder rates, the total rate, always equals the communication channel capacity. This maximizes the efficiency of communication channel utilization and also eliminates the possibility of allocating more capacity to the encoders than communication channel 330 can support.

After switch rate step 406 is completed processing transfers to period complete step 407. When the period is complete, steps 402–407 are repeated. Thus, the operations in steps 402–407 occur once every period.

INITIALIZATION STEP 401

In one embodiment of initialization step 401, system supervisor 340 specifies the total number of fixed rate applications and the total number of variable rate applications processed by statistical multiplexer 300. System supervisor 340 also specifies parameters needed to characterize a primary packet schedule table, sometimes called a primary table, used by statistical multiplexer 300. The primary packet schedule table parameters include a number N of packets that are supplied by statistical multiplexer 300 to communication channel 330 in approximately one second, i.e, a size of the primary packet schedule table, and a number V of entries in the primary schedule table that must be allocated to variable rate applications.

In initialization step 401, system supervisor 340 sets a parameter, called distortion threshold $Dmax\_i$, which is sometimes referred to as the target distortion, for each variable rate application 301-i. In this embodiment, distortion threshold $Dmax\_i$ is a distortion such that distortion above distortion threshold $Dmax\_i$ is deemed noticeable to the human eye. Distortion threshold $Dmax\_i$ is non-negative and in one embodiment, is a non-negative real number with two byte precision.

System supervisor 340 also sets rate bounds, typically in bits/second, for each of applications 301-1 to 301-L in initialization step 401. For variable rate applications, the rate bounds are defined by a minimum data rate $Rmin\_i$, a maximum data rate $Rmax\_i$, and a guaranteed data rate $Rgtd\_i$. For fixed rate applications, the three rate bounds are set to the same value by system supervisor 340.

Minimum rate $Rmin\_i$ is a lower bound on the rate allocated to a variable rate application 301-i by statistical multiplexer 300. In other words, this rate is assured irrespective of the reconstruction quality of that application. Minimum rate $Rmin\_i$ can not be negative.

Maximum rate $Rmax\_i$ is an upper bound on the rate allocated to a variable rate application 301-i by statistical multiplexer 300. This rate cannot be exceeded irrespective of the reconstruction quality of that application. Herein, the reconstruction quality is measured by a distortion factor $D\_i$, as explained more completely below. Maximum rate $Rmax\_i$ is equal to or greater than minimum rate $Rmin\_i$.

Guaranteed rate $Rgtd\_i$ is a rate that is guaranteed by statistical multiplexer 300 to a variable rate application 301-i to enable that application to achieve its target distortion. This parameter may or may not be used by a particular application as determined by system supervisor 340. If guaranteed rate $Rgtd\_i$ is to be ignored, distortion threshold $Dmax\_i$ is set equal to zero at configuration time. Otherwise, guaranteed rate $Rgtd\_i$ must be within the range [$Rmin\_i$, $Rmax\_i$]. Independent of whether guaranteed rate $Rgtd\_i$ is used, at start-up, each variable rate application initially is assigned its guaranteed rate $Rgtd\_i$. Further, the sum of all guaranteed rates $Rgtd\_i$ for variable rate applications, and the actual rates of all fixed rate applications, which are represented herein by $Rmin\_i$, should equal the channel capacity, i.e., $$\sum_{i \in A} Rgtd\_i + \sum_{j \in B} Rmin\_j = \text{channel capacity}$$

where "A" is the set of all applications 301-i that have a specified guaranteed rate $Rgtd\_i$ and "B" is the set of all other applications. Not all the applications connected to multiplexer 300 need be statistically multiplexed, i.e., some or all of the applications can have fixed rates for the entire duration of operation. In this embodiment, it is the responsibility of system supervisor 340 to ensure that the above relationship is satisfied.

The rates specified by system supervisor 340 are usually specified in terms of bits/second. In reality, most systems transfer bits from the encoder buffer in the form of "packets", where a packet contains several bits. In other words, quantization of rate is not at the bit-level, but at the level of several bits. In such a system, the communication channel capacity is translated to a specific number of packets/second. These packets must be allocated to encoders 302-1 to 302-L such that each encoder's rate requirement is satisfied. Consequently, the rates in bits/second are converted in initialization step 401 to the appropriate packets per time interval.

Specifically, each rate is converted to a rate in packets per second. Since N is the number of entries in the primary table, each rate is converted to the number of packets in primary packet schedule table (packets per P.T.) that corresponds to the rate in bits per second.

In one embodiment, as explained more completely below, statistical multiplexer 300 also uses a secondary table that has a fixed number of entries S. For each variable rate application, the rate is also converted to the number of packets in the secondary packet schedule table (packets per S.T.). If S is 192, the rate in packets/S.T. is R(packets/S.T.)=int(R(packets/P.T.)×(192/V))

where "int" is the integer function. Since the sum of the assigned rates, which in this embodiment are the guaranteed rates, should equal the total communication channel capacity allocated to variable rate encoders 302-i, the sum of the assigned rates in packets/S.T. equals 192. The truncation introduced by the integer function may cause the sum of the assigned rates to be less than the total communication channel capacity allocated to variable rate encoders 302-i. In this case, any unassigned packets are arbitrarily assigned to variable rate encoders by statistical multiplexer 300.

After the translation of the rates to packets/S.T., statistical multiplexer 300 recalculates the rates in terms of bits/second and the resulting guaranteed rate Rgtd_i is passed to encoder 302-i. This recalculation is necessitated by the truncation introduced by the integer function. To facilitate the recalculation, system supervisor 340 provides statistical multiplexer 300 a rate calibration constant Y, which is defined as:

$$Y = \frac{C \times (1 - TOL_M) \times (P - OV) \times V}{N \times 192 \times (1 + TOL_V) \times 400 \times P}$$

where:

OV is the number of overhead bits in each packet, which in this embodiment is 24 bits;

C is the nominal total statistical multiplexer output rate (in bits/second);

$TOL_M$ is the tolerance of the statistical multiplexer clock (expressed as a fraction), P is the channel packet size in bits (1040 bits in one embodiment);

V is the total number of entries in the primary table assigned to variable rate applications;

N is the total number of entries in the primary table; and $TOL_V$ is the tolerance of the data rate at the input to the encoder.

Rate calibration constant Y is provided to each encoder 302-1 to 302-L at configuration time. A rate R in bits/second corresponding to Q packets/S.T. is given by:

R=400×int (Q×Y)

where "int" is the integer function;

Q is the number of packets/S.T. assigned to an application; and the constant "400" is required by the MPEG compression standard which counts rates in multiples of 400 bits/second. In other applications, where a finer resolution on the rates is allowed, the above relationship is easily modified by those skilled in the art.

System supervisor 340 in initialization step 401 assigns a priority number P_i for each variable rate encoder 302-i to indicate its importance. The greater the importance of a variable rate encoder 302-i, the higher is priority number P_i for that encoder. Priority number P_i is used to weight the distortion of each variable rate encoder 302-i, as explained more completely below. Consequently, a large priority number P_i artificially scales up the distortion, resulting in variable rate encoder 302-i demanding more bits of communication channel 330. Priority number P_i is non-negative and, in one embodiment, is an integer within the range of [1, 16]. In one embodiment, statistical multiplexer 300 normalizes priority number P_i of each variable rate encoder 302-i by dividing priority number P_i by the average of all of priority numbers. The resulting normalized priority number, which is also indicated by P_i, is stored by statistical multiplexer 300 in memory 313 and is used in the operations described below.

Associated with each variable rate application 301-i are two hysteresis coefficients K1_i and K2_i, which are used to introduce hysteresis in the process of determining rates for each fixed time interval. In this embodiment, the default values for hysteresis coefficients K1_i and K2_i are 0.9 and 1.1, respectively.

For each variable rate encoder 302-i, system supervisor 340 also defines maximum buffer size Bmax_i for encoder 302-i. Statistical multiplexer 300 uses maximum buffer size Bmax_i and maximum rate Rmax_i for each variable rate encoder 302-i to determine the end-to-end system delay time $\delta\_i$, i.e., the time in seconds from when a frame is input to an encoding system to when it is ultimately displayed by the decoding system. As will be appreciated by those skilled in the art, the end-to-end system delay time is actually system delay time $\delta\_i$ plus other time delays introduced by frame buffering etc. However, for statistical multiplexer 330, the relevant information for a variable rate encoder 302-i is captured by defining end-to-end system delay time $\delta\_i$ as:

$\delta\_i = Bmax\_i/Rmax\_i$

System delay time $\delta\_i$, in this embodiment, cannot be changed without loss of encoder-decoder picture synchronization until the next re-configuration time. Statistical multiplexer 300 ensures that system delay time $\delta\_i$ for each application 301-i is not altered and at the same time there is no buffer over-flow or under-flow in the encoding and decoding systems. In another embodiment, system delay time $\delta\_i$ is allowed to change and frame dropping and/or repeating is allowed in the display.

In initialization step 401, system supervisor 340 sets the starting distortion D_i for each variable rate application 301-i to its distortion threshold Dmax_i. Table I is a summary of the parameters provided by system supervisor 340 to statistical multiplexer 300 for each variable rate encoder 302-i. In another embodiment, the information in Table I could be supplied for both variable and fixed rate encoders.

TABLE I

| Parameters Required by Statistical Multiplexer | | |
|---|---|---|
| Parameter | Range | Type |
| Rmin | 0 to 192 | 16-bit integer |
| Rmax | 0 to 192 | 16-bit integer |
| Rgtd | 0 to 192 | 16-bit integer |
| P | 1 to 16 | 16-bit integer |

TABLE I-continued

Parameters Required by Statistical Multiplexer

| Parameter | Range | Type |
|---|---|---|
| S | | (High 12-bits reserved: bit 15(MSB) is "1" for fixed rate and "0" for variable rate) |
| Dmax | | 16-bit integer |
| Bmax | number of 400-bit units. | 16-bit integer |

The particular ranges and types of the parameters given in Table I are only illustrative of one embodiment of this invention and are not intended to limit the invention to the particular information given.

COLLECTION AND CLASSIFICATION STEP 402

As explained briefly above, the collection portion of step 402 collects data required to determine distortion D_i for each variable rate encoder 302-i and the variation in buffer fullness of each variable rate encoder 302-i on an ongoing basis. In one embodiment, communication between encoders 302-1 to 302-L and statistical multiplexer 300 is implemented through a "message cycle". Statistical multiplexer 300 can read or write one byte of information to any of encoders 302-1 to 302-L during a message cycle in each packet time. A packet time, sometimes called a packet interval, is typically the time interval required to transmit 130 bytes of data over communication channel 330, but the time and/or the packet size can vary. In addition, statistical multiplexer 300 can broadcast a byte of information to all encoders 302-1 to 302-L during the message cycle. If encoder 302-i merely passes the parameters necessary to determine distortion D_i to statistical multiplexer 300, distortion D_i spans several packet times for that encoder.

The particular process used to pass data between statistical multiplexer 300 and encoders 302-1 to 302-L is not critical to this invention. The important aspect is the data required by statistical multiplexer 300 and how statistical multiplexer 300 processes the data. In view of the description of the operation of statistical multiplexer 300, the required data can be passed in a wide variety of ways. Nevertheless, in one embodiment, all direct communication between statistical multiplexers 300 and encoders 302-1 to 302-L is performed by reading entries from and writing entries to a general communications table in memory 313 of statistical multiplexer 300.

Specifically, when an entry is written to the general communications table by processor 312, state machine 311 controls hardware that (a) writes one byte to a first register onboard an encoder 302-i or to a first first-in-first-out memory (FIFO) onboard an encoder 302-i, or (b) reads one byte from a second register onboard encoder 302-i or from a second first-in-first-out memory (FIFO) onboard encoder 302-i over application control bus 360. The first register onboard each encoder 302-i contains a write owner FIFO flag and a read owner FIFO flag either of which can be set to "mux" or "encoder." The second register onboard each encoder 302-i contains a write data valid flag. Herein, first and second FIFOs and registers are used, but this is illustrative only and those skilled in the art will recognize that the communications between encoders 302-i and statistical multiplexer 300 can be accomplished in a wide variety of ways without affecting the operation of statistical multiplexer 300. The important aspect, as indicated above, is that each encoder collects distortion and buffer fullness data and the data are communicated to statistical multiplexer 300 at appropriate intervals for operation of statistical multiplexer 300. Also, statistical multiplexer 300 must communicate new rate information to variable rate encoders 302-i once per statistical multiplexer cycle.

Two processes are used to communicate data from encoder 302-i to statistical multiplexer 300. In a first process, statistical multiplexer 300, in the following order, (1) sets the write FIFO owner flag of encoder 302-i to "mux"; (2) reads the write data valid flag and six bytes from the first FIFO; and (3) sets the write FIFO owner flag to "encoder". When this process is completed for encoder 302-i, statistical multiplexer 300 examines the write data valid flag and if the flag is not valid, discards the six bytes of data. This process is repeated for each encoder at least once every twenty milliseconds.

In the second process used to communicate data from encoder 302-i to statistical multiplexer 300, encoder 302-i checks the write FIFO owner flag and the state of the first FIFO when encoder 302-i has collected the distortion and buffer fullness data, which is once per picture. If the write FIFO owner flag is set to "encoder," and the first FIFO is empty, encoder 302-i writes the collected data to the first FIFO and upon completion sets the write data valid flag. If either of the conditions is not true, encoder 302-i waits until both conditions are true before writing to the first FIFO. If new data becomes available before the collected data can be written to the first FIFO, the collected data is discarded and replaced with the new data.

Data communication from statistical multiplexer 300 to encoder 302-i, i.e., transfer of a new rate, is done in a three step process. Statistical multiplexer 300, in the following order, (1) sets the read FIFO owner flag of encoder 302-i to "mux"; (2) writes the new rate to the second FIFO; and (3) sets the read FIFO owner flag to "encoder". The writes to the read FIFO owner flag generates interrupts to the encoder processor. In response to the interrupt, the encoder processor reads data from the second FIFO until the FIFO is empty.

As each set of parameters for a picture is received by statistical multiplexer 300 from encoder 302-i using the process just described, the set of parameters are used along with the assigned priority P_i to generate an instantaneous distortion d_i. Instantaneous distortion d_i is used to update distortion D_i for variable rate encoder 302-i.

In one embodiment, distortion D_i for each application is determined recursively, e.g., distortion D_i is the average of the previous three distortion values. Using a running average for distortion D_i, as opposed to the most recently determined value, protects against sudden spikes in distortion D_i.

In another embodiment, a recursive filter is used to update distortion D_i. Specifically, $$D\_i = (\beta * (D\_i)) + ((1-\beta) * (d\_i)).$$

The recursive filter introduces damping which also protects against sudden spikes in distortion D_i. The value of constant $\beta$ is determined empirically and a value of 0.8 is used in one embodiment.

When a data collection cycle is closed, distortion D-i, i=1, ..., NV, for all variable rate encoders and the current rates R_i, i=1, ..., NV, are always known because the rates and distortions either are set at configuration time in step 401, as described above, or are the rates and distortions from the previous statistical multiplexer cycle.

The classification portion of step 402 assigns each variable rate application 301-i to one of a plurality of classes using the current rates and distortions. In one embodiment, six classes are defined according to Table II.

TABLE II

Class Definition for New Rate Generation

| | $D < K1*Dmax$ | $K1*Dmax < D < K2*Dmax$ | $D > K2*Dmax$ |
|---|---|---|---|
| $R < Rgtd$ | Class 1 | Class 2 | Class 3 |
| $R \geq Rgtd$ | Class 4 | Class 5 | Class 6 |

The purpose of the classification portion of step 402 is to identify for each variable rate application 301-i whether current rate $R\_i$ for that application is providing an acceptable distortion $D\_i$ and classify application 301-i for the appropriate action in modify rates step 403. Process 500 is one possible implementation of the classification portion of step 402.

Step 501 checks to determine whether each of the variable rate applications 301-i, i=1, . . . , NV, has been processed. If variable rate applications remain to be processed, distortion $D\_i$ for the next variable rate application 301-i is checked in distortion too high check step 502. Specifically, distortion $D\_i$ is compared with a maximum distortion $(K2\_i)*(Dmax\_i)$, where the maximum distortion is the product of second hysteresis coefficient $K2\_i$ and distortion threshold $Dmax\_i$ for that application, i.e., $$D\_i > (K2\_i) * (Dmax\_i).$$

If distortion $D\_i$ is too high, processing transfers from step 502 to rate check step 503, and conversely to distortion too low step 506. In rate check step 503, if rate $R\_i$ is less than guaranteed rate $Rgtd\_i$ for application 301-i, processing transfers to step 504 and otherwise to step 505. In step 504, application 301-i is assigned to Class 3 and in step 505, application 301-i is assigned to Class 6. Steps 504 and 505 transfer to additional application step 501.

Each application 301-i in Class 3 is currently allocated less than guaranteed rate $Rgtd\_i$ and is being compressed at a quality level less than the maximum distortion. Consequently, the rates of the applications in Class 3 should be increased. Each application 301-i in Class 6 is currently allocated at least guaranteed rate $Rgtd\_i$ and is being compressed at a quality level less than the maximum distortion. Applications 301-i in Class 6 compete among themselves for rate increases, as described more completely below.

In distortion too low step 506, distortion $D\_i$ for application 301-i is compared with a minimum distortion $(K1\_i)*(Dmax\_i)$, where the minimum distortion is the product of first hysteresis coefficient $K1\_i$ and distortion threshold $Dmax\_i$ for application 301-i, i.e., $$D\_i < (K1\_i) * (Dmax\_i).$$

If distortion $D\_i$ is too low, processing transfers from step 506 to rate check step 507, and conversely to rate check step 510. In rate check 507, if rate $R\_i$ is less than guaranteed rate $Rgtd\_i$ for variable rate application 301-i, processing transfers to step 508 and otherwise to step 509. In step 508, application 301-i is assigned to Class 1 and in step 509, application 301-i is assigned to Class 4. Steps 508 and 509 transfer to additional application step 501.

Applications in Classes 1 and 4 have a distortion $D\_i$ that is less than the lower limit of the acceptable range and so are being compressed at a quality level that is better than their target quality as defined by the minimum distortion. In other words, current rate $R\_i$ for each variable rate application 301-i in this group is in excess of the rate required to operate at the target distortion level, i.e., within a range of acceptable distortion. Consequently, the rate for each application in this group can be decreased.

If an application reaches step 510, distortion $D\_i$ is within an acceptable range. Specifically, distortion $D\_i$ of application 301-i is greater than minimum distortion $(K1\_i)*(Dmax\_i)$ and less than maximum distortion $(K2\_i)*(Dmax\_i)$, i.e., $$(K1\_i)*(Dmax\_i) <= D\_i <= (K2\_i) * (Dmax\_i).$$

Thus, the application is being compressed at the right quality level. Hence, no change is required in current rate $R\_i$ for variable rate application 301-i. Applications in this group are assigned to Class 2 in step 511 if current rate $R\_i$ is less than guaranteed rate $Rgtd\_i$ and otherwise to Class 5 in step 512. Steps 511 and 512 transfer to additional application step 501.

Thus, process 500 assigns each of the variable rate applications to one of the six classes defined in Table II. The rates for applications in Class 2 are not changed. However, as discussed below, modify rates step 403 can change the rates for applications in Classes 1 and 3 to 6. Prior to entering step 403, delta rate increases ΔD, ΔI, and ΔC, as defined below, are zeroed.

MODIFY RATES STEPS 403

In modify rates step 403, the rates for variable rate applications in Classes 1 and 4 are processed as a group. The rates for variable rate applications in Class 3 and the rates for variable rate applications in Class 6 are processed separately. If after the rate adjustments, the capacity of communication channel 330 is not fully utilized, the rates of applications in Classes 3 and 6 are revised. Conversely, if after the rate adjustments, the capacity of communication channel 330 is exceeded, the rates of applications in Classes 4 to 6 are revised. In one embodiment, all rates are measured in units of packets/secondary table. The unit used to measure the rate affects the choice of coefficients that are determined empirically. Hence, a different unit of measure for the rates will require a different value for the empirically determined coefficients.

Lower rate process 600 illustrates the rate modification process within step 403 for applications in Classes 1 and 4, i.e., applications with too low a distortion $D\_i$. Lower rate process 600 is iteratively performed for each application 301-i in Classes 1 and 4.

In this embodiment, lower rate process 600 uses a proportional feedback loop to decrease current rate $R\_i$ for each application 301-i with too low distortion $D\_i$. Use of a proportional feedback loop assumes implicitly that rate $R\_i$ and distortion $D\_i$ of every application 301-i are inversely proportional to each other. In general, such an assumption is not true. However, according to the principles of this invention, rate $R\_i$ is allowed to change only in small increments, as described below, and so there is not too much deviation from the actual rate-distortion curve. This assumption is utilized in all rate adjustment processes in this embodiment. Of course in other embodiments, different functional relationships between a rate and distortion could be used. Also, different functional relationships between a rate and distortion could be used in the various processes that make-up step 403.

A new rate Rnew_i for application 301-i with too low distortion D_i is determined in adjust rate step 601. In adjust rate step 601, old rate Rold_i is set equal to the current rate R_i for variable rate application 301-i, e.g, a table of current rates is copied to a table of old rates. Herein, reference numeral Rnew_i is used to distinguish between the old rate and the new rate. In fact, each new rate Rnew_i is stored at the appropriate location in the table of current rates so that at the end of modify rates step 403, the table of current rates contains the new rates for the next statistical multiplexer cycle. In this way only two structures, e.g., the two tables, are utilized in modify rates step 403. Therefore, references herein to a new rate is the rate in the current rate table.

The normalized difference between distortion threshold Dmax_i and distortion D_i is scaled by a constant c and added to old rate Rold_i to generate new rate Rnew_i. In one embodiment, constant c was empirically determined and set to a value of 16. Specifically, $$Rnew\_i = Rold\_i + (c * ((D\_i - Dmax\_i)/Dmax\_i)).$$

Herein, constant c has the same values for all applications in all classes. However, constant c could also be defined on an application by application basis or alternatively on a class by class basis.

Next, adjust rate step 601 checks new rate Rnew_i to ensure that new rate Rnew_i is within a predetermined range, i.e., the change in the rate is a small decrement. In one embodiment, new rate Rnew_i must be in the range of a lower rate bound and an upper rate bound, e.g.,:

$$s * (Rold\_i) \leq Rnew\_i < Rold\_i$$

In this embodiment, the value of constant s was empirically chosen as 0.9. If new rate Rnew_i is less than lower rate bound s*Rold_i, new rate Rnew_i is set equal to lower rate bound s*Rold_i.

After new rate Rnew_i is tested to determine whether the change in the rate is constrained to a small decrement, new rate Rnew_i is tested to determine whether new rate Rnew_i is less than minimum rate Rmin_i for application 301-i. If new rate Rnew_i is less than minimum rate Rmin_i for application 301-i, new rate Rnew_i is set equal to minimum rate Rmin_i. Upon completion of adjust rate step 601, processing transfers to adjust buffer size step 602.

To maintain a constant delay time through the system, a decrease in rate R_i of application 301-i is accompanied by a proportional decrease in the effective buffer size of encoder 302-i. Thus, adjust buffer size step 602 determines a new effective buffer size. In this embodiment, new effective buffer size "buf_sz_i" is equal to the product of new rate Rnew_i and system delay time interval δ_i. Specifically, $$(buf\_sz\_i) = (\delta\_i) * (Rnew\_i)$$

However, the buffer size cannot be decreased arbitrarily. Obviously, care must be taken to ensure that new buffer size buf_sz_i is not less than the current buffer fullness. Actually, there is an even more strict requirement. New buffer size buf_sz_i should not be less than the instantaneous fullness of the encoder buffer as measured over a period of time equal to system delay time interval δ_i that just preceded the current time. Hence, as described above, statistical multiplexer 300 obtains the buffer fullness value at the end of each picture for application 301-i and stores the largest buffer fullness value, over the period of time δ_i that just preceded the current time, in memory 313 as maximum buffer fullness threshold max_buffer_i.

It is possible to decrease a rate R_i without regard to buffer fullness if the decoder buffer is at least as large as the encoder buffer multiplied by the ratio of maximum rate Rmax_i to minimum rate Rmin_i. However, this typically requires a large size for the decoder buffer. If the encoder and decoder are to have the same size buffers, the buffer fullness must be considered before decreasing a rate.

Whenever, a rate is decreased, it is important to ensure that all the bits that have already been inserted into the encoder buffer up to a time δ_i before the rate change are delivered to the decoder in time δ_i. This is an issue because the new rate, at which bits will be delivered, is lower than the old rate at which they were generated. Thus, the rate can be decreased if and only if the buffer fullness over the time interval equal to time δ_i before the rate change is instituted does not exceed the new buffer size.

Hence, threshold max_buffer_i is compared with new buffer size buf_sz_i. If new buffer size buf_sz_i is less than maximum buffer fullness threshold max_buffer-i, new rate Rnew_i is set equal to old rate Rold_i. Otherwise, new rate Rnew_i is retained and the operations in adjust buffer size step 602 are complete and processing transfers to accumulate rate change step 603.

In accumulate rate change step 603, the change in rate for application 301-i, i.e., the difference between new rate Rnew_i and old rate Rold_i is determined and added to delta rate decrease ΔD. Specifically, delta rate decrease ΔD is the accumulation between new rate Rnew_i and old rate Rold_i for applications 301-i with too low distortions. Recall that above delta rate decrease ΔD was initialized to zero and is reset to zero at the start of each statistical multiplexer cycle.

$$\Delta D = \Sigma(Rnew\_i - Rold\_i)$$

Delta rate decrease ΔD is negative. Upon completion of accumulate rate change step 603, processing transfers to step 604 which in turn checks whether there are additional applications in Classes 1 and 4 for processing. If all applications in Classes 1 and 4 have been processed, step 604 transfers to processes complete step 630 and otherwise to step 601.

Applications in Classes 3 and 6 have a distortion D_i that is too high. Applications in Class 3 have a current rate R_i that is less than guaranteed rate Rgtd_i. Each of these applications is processed in increase rate process 605 within modify rates step 403.

Applications processed in increase rate process 605 are currently allocated less than their guaranteed rates, but the applications are being compressed at a quality level that is less than the target quality as defined by maximum distortion (K2_i)*(Dmax_i). Consequently, rate R-i for each of these applications is increased until application 301-i has distortion D_i in the acceptable distortion range, or until the application has been allocated guaranteed rate Rgtd_i, which ever comes first.

In this embodiment, increase rate process 605 uses a proportional feedback loop to increase current rate R_i for each application 301-i in Class 3. Use of a proportional feedback loop assumes implicitly that rate R_i and distortion D_i of every application 301_i in Class 3 are inversely proportional to each other. In general, such an assumption is not true. However, according to the principles of this invention, rate R_i is allowed to change only in small increments, as described below, and so there is not too much deviation from the actual rate-distortion curve.

New rate Rnew_i for application 301-i in Class 3 is determined in adjust rate step 606. In adjust rate step 606, old rate Rold_i is set equal to the current rate R_i for application 301-i. The normalized difference between distortion threshold Dmax_i and distortion D_i is scaled by a constant c and added to old rate Rold_i to generate new rate Rnew_i. Specifically, $$Rnew\_i = Rold\_i + (c * (D\_i - Dmax\_i)/Dmax\_i)$$

In one embodiment, constant c was empirically determined and set to a value of 16.

Next, adjust rate step 606, checks new rate Rnew_i to ensure that the change in rate is a small increment. In one embodiment, new rate Rnew_i must be in a range defined by a lower rate bound and an upper rate bound, e.g.,:

$$Rold\_i \leq Rnew\_i < t * Rold\_i.$$

In this embodiment, constant t was empirically selected as 1.1. If new rate Rnew_i is greater than upper rate bound t*Rold_i, new rate Rnew_i is set equal to upper rate bound t*Rold_i. After new rate Rnew_i is tested to determine that the change in the rate is constrained to a small increment, new rate Rnew_i is tested to determine whether new rate Rnew_i is greater than guaranteed rate Rgtd_i for application 301-i. If new rate Rnew_i is greater than guaranteed rate Rgtd_i for application 301-i, new rate Rnew_i is set equal to guaranteed rate Rgtd_i.

Upon completion of adjust rate step 606, a buffer fullness check, as described above, is not necessary since an increase in rate is accompanied by an increase in effective buffer size. Therefore, processing transfers from adjust rate step 606 to accumulate rate change step 607.

In accumulate rate change step 607, the change in rate for application 301-i, i.e., the difference between new rate Rnew_i and old rate Rold_i, is determined and added to delta rate increase ΔI, which in turn is stored in memory 313. Recall that above delta rate increase ΔI was initialized to zero and is reset to zero at the start of each statistical multiplexer cycle. Specifically, $$\Delta I = \Sigma (Rnew\_i - Rold\_i)$$

Delta rate increase ΔI is positive. Upon completion of accumulate rate change step 607, processing transfers to step 608 which in turn checks whether there are additional applications in Class 3 for processing. If all applications in Class 3 have been processed, step 607 transfers to processes complete step 630 and otherwise to step 606. Thus, process 605 is sequentially performed for each variable rate application 301-i in Class 3.

The applications in Class 6 have a distortion D_i that is greater than maximum distortion (K2_i)*(Dmax_i) and a rate R_i that is greater than or equal to guaranteed rate Rgtd_i. The applications in Class 6 are being compressed at distortion values in excess of the target quality despite the fact that the applications have been allocated at least their guaranteed rate. These applications compete amongst themselves in competitive increase rate process 610 to equalize their distortions.

Specifically, in average distortion step 611, average distortion Davg of all the applications in Class 6 is determined. Specifically, $$Davg = \frac{1}{H} \Sigma D\_i$$

where H is the total number of applications in Class 6. Upon completion of average distortion step 611, steps 612 to 616 are performed for each variable rate application 301-i in Class 6. Processing transfers from average distortion step 611 to adjust rate step 612.

In adjust rate 612 step, old rate Rold_i is set equal to current rate R_i for application 301-i. The normalized difference between average distortion Davg and distortion D_i is scaled by a constant c and added to old rate Rold_i to generate new rate Rnew_i. In one embodiment, constant c was empirically determined and set to a value of 16. Specifically, new rate Rnew_i is:

$$Rnew\_i = Rold\_i + (c * (D\_i - Davg)/Davg)$$

Next adjust rate step 612 checks new rate Rnew_i to be sure that the change in rate is small. If new rate Rnew_i increased, new rate Rnew_i must be in the range defined by a lower rate bound and an upper rate bound, e.g.,:

$$Rold\_i \leq Rnew\_i < t * (Rold\_i)$$

In one embodiment, constant t was empirically selected as 1.1. If new rate Rnew_i is greater than upper rate bound t*Rold_i, new rate Rnew_i is set equal to upper rate bound t*Rold_i.

Conversely, if new rate Rnew_i decreased, new rate Rnew_i must be in the range of lower rate bound and an upper rate bound, e.g.,:

$$s*(Rold\_i) \leq Rnew\_i < Rold\_i$$

In one embodiment, the value of constant s was empirically chosen as 0.9. If new rate Rnew_i is less than lower rate bound s*Rold_i, new rate Rnew_i is set equal to lower bound rate s*Rold_i.

After new rate Rnew_i is tested to determine that the change in the rate is small, new rate Rnew_i is tested to determine whether new rate Rnew_i is in the range of guaranteed rate Rgtd_i to maximum rate Rmax_i. If new rate Rnew_i is less than guaranteed rate Rgtd_i for application 301-i, new rate Rnew_i is set equal to guaranteed rate Rgtd_i. If new rate Rnew_i is greater than maximum rate Rmax_i for application 302-i, new rate Rnew_i is set equal to maximum rate Rmax_i.

Upon completion of adjust rate step 612, processing transfers to rate decrease check step 613. If adjustment of the rate resulted in a rate decrease, processing transfers from rate decrease check step 613 to adjust buffer step 614, and otherwise to accumulate rate change step 615.

Adjust buffer 614 step is identical to adjust buffer step 602 described above and that description is incorporated herein by reference. Upon completion of adjust buffer step 614, processing transfers to accumulate rate change step 615.

Like the other accumulate rate change steps 603 and 607, described above, accumulate rate change step 615 accumulates the difference between the new and old rates for all variable rate applications in Class 6. Specifically, $$\Delta C = \Sigma (Rnew\_i - Rold\_i)$$

Here, ΔC can be either positive or negative and is zeroed at the start of each statistical multiplexer cycle. Upon completion of accumulate rate change step 615, processing transfers to step 616 which in turn checks whether there are additional applications in Class 6 for processing. If all applications in Class 6 have been processed, step 616 transfers to processes complete step 630 and otherwise to step 612. Thus, steps 612 to 616 of process 610 are iteratively performed for each application in Class 6.

Within step 403, processes 600, 605, and 610 can run sequentially or in parallel. When all of the applications in Classes 1, 3, 4, and 6 are processed, processes complete check 630 passes processing to accumulate rate changes step 620. Accumulate rate changes step 620 determines the total difference between the new rates and the old rates so that capacity of communication channel 330 can be fully utilized but not overloaded. In step 620, net rate change $\Delta$ is determined by summing $\Delta D$, $\Delta I$, and $\Delta C$. Specifically, $$\Delta = \Delta D + \Delta I + \Delta C$$

If net rate change $\Delta$ is less than zero, the operations performed so far in modify rates step 403 have resulted in a net decrease in the allocated rates. Conversely, if net rate change $\Delta$ is greater than zero, the operations performed so far in modify rates step 403 have resulted in a net increase in the allocated rates. If net rate change $\Delta$ is zero, the operations performed so far in modify rates step 403 have resulted in no net change in the allocated rates. Channel capacity check 621 determines which of these options occurred.

If there is a net decrease in the allocated rates, check 621 passes processing to increase rates step 623 which in turn distributes the available bits, as described below, amongst the applications in Classes 3 and 6 so as to maximize the channel bandwidth usage. If there is a net increase in the allocated rates, check 621 passes processing to decrease rates step 622, which in turn reduces the rates of some of the applications so as to operate within the capacity of communication channel 330. If there is no net change in the allocated rates, check 621 transfers processing directly to build packet table step 404. Similarly, upon completion, step 623 transfer processing to step 404. Step 622 transfers processing to step 404, if the rates are successfully decreased and otherwise to step 407.

Figure 7:
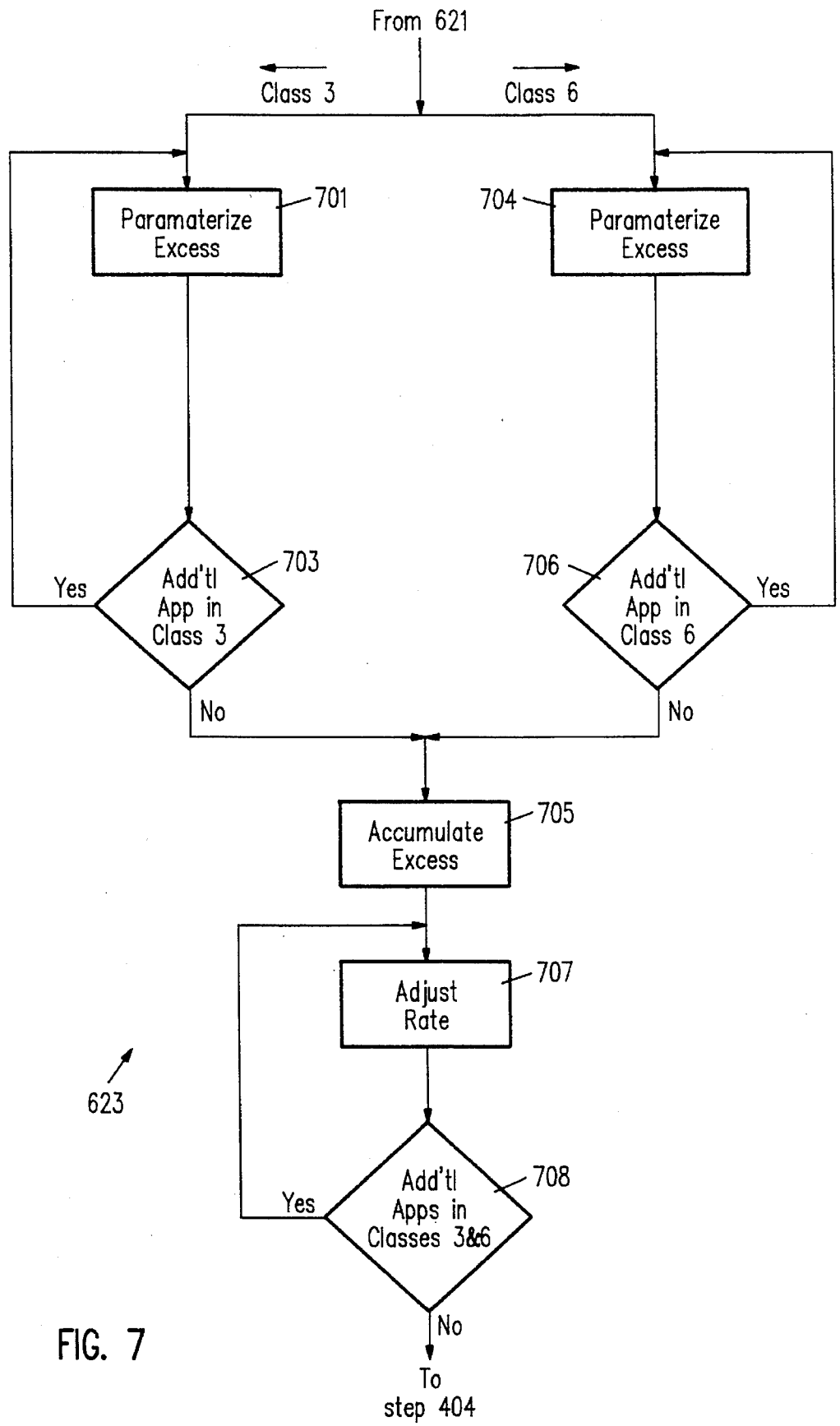
FIG. 7 is a more detailed process flow diagram for increase rates steps 623 within step 403 of this invention.

The process of increase rates step 623 is shown in more detail in FIG. 7. Applications with distortion D_i greater than maximum distortion (K2_i)*(Dmax_i), i.e., applications in Classes 3 and 6, are considered as candidates for increased rates. Within step 623, applications in Class 3 are initially processed separately from applications in Class 6.

In a first parameterize excess step 701 for Class 3 applications, parameter excess_i is generated by subtracting new rate Rnew_i from guaranteed rate Rgtd_i. Parameter excess_i is stored for subsequent use. In a second parameter excess step 704 for Class 6 applications, parameter excess_i is generated by subtracting new rate Rnew_i from maximum rate Rmax_i. Parameter excess_i generated in step 704 also is stored for subsequent use.

Parameterize excess step 701 transfers processing to additional applications step 703, which returns processing to step 701 if additional Class 3 applications remain to be processed and otherwise to step 705. Similarly, parameterize excess step 704 transfers processing to additional applications step 706, which returns processing to step 704 if additional Class 6 applications remain to be processed and otherwise to step 705.

When all applications in Classes 3 and 6 have been processed in steps 701 to 703 and 704 to 706, respectively, accumulate excess step 705 begins processing. Initially, in accumulate excess step 705 a parameter sum_excess is stored as zero. Accumulate excess step 705 retrieves parameter sum_excess from memory 313 and adds each parameter excess_i in succession to the current value of parameter sum_excess. The final value of parameter sum_excess is then stored in memory 313.

In adjust rate step 707, revised new rate Rrnew_i is generated by increasing rate Rnew_i by the fraction of the available channel capacity attributable to this application. Recall, that as described above, two structures are used. At this point, the first structure has the original rates for applications 301-i in Classes 2 and 5 and the new rates for applications 301-i in Classes 1, 3, 4, and 6. The second structure has the original rates for applications 301-i in Classes 1, 3, 4, and 6. In adjust rate step 707 only the first structure is used. Here, new rate Rnew_i refers to the rate in the first structure at the start of step 707. New rate Rnew_i is processed to generate a revised new rate Rrnew_i, which is then stored in the first structure. Specifically, $$Rrnew\_i = Rnew\_i - \frac{excess\_i}{sum\_excess} \times \Delta$$

Next adjust rate step 707 checks revised new rate Rrnew_i to be sure that the change in rate is a small increment. Revised new rate Rrnew_i must be in the range defined by a lower rate bound and an upper rate bound, e.g.,:

$$Rold\_i \leq Rrnew\_i < t * (Rold\_i)$$

In one embodiment, constant t was empirically selected as 1.1. If revised new rate Rrnew_i is greater than upper rate bound t*Rold_i, revised new rate Rrnew_i is set equal to upper rate bound t*Rold_i.

Upon completion of step 707, step 708 checks whether there are any remaining applications in Classes 3 and 6 that have not been processed in step 707. If there are remaining applications, processing returns to step 707. After each of the applications in Classes 3 and 6 have been processed in step 707, any channel packets that remain unassigned are transmitted as idle packets.

Figure 8:
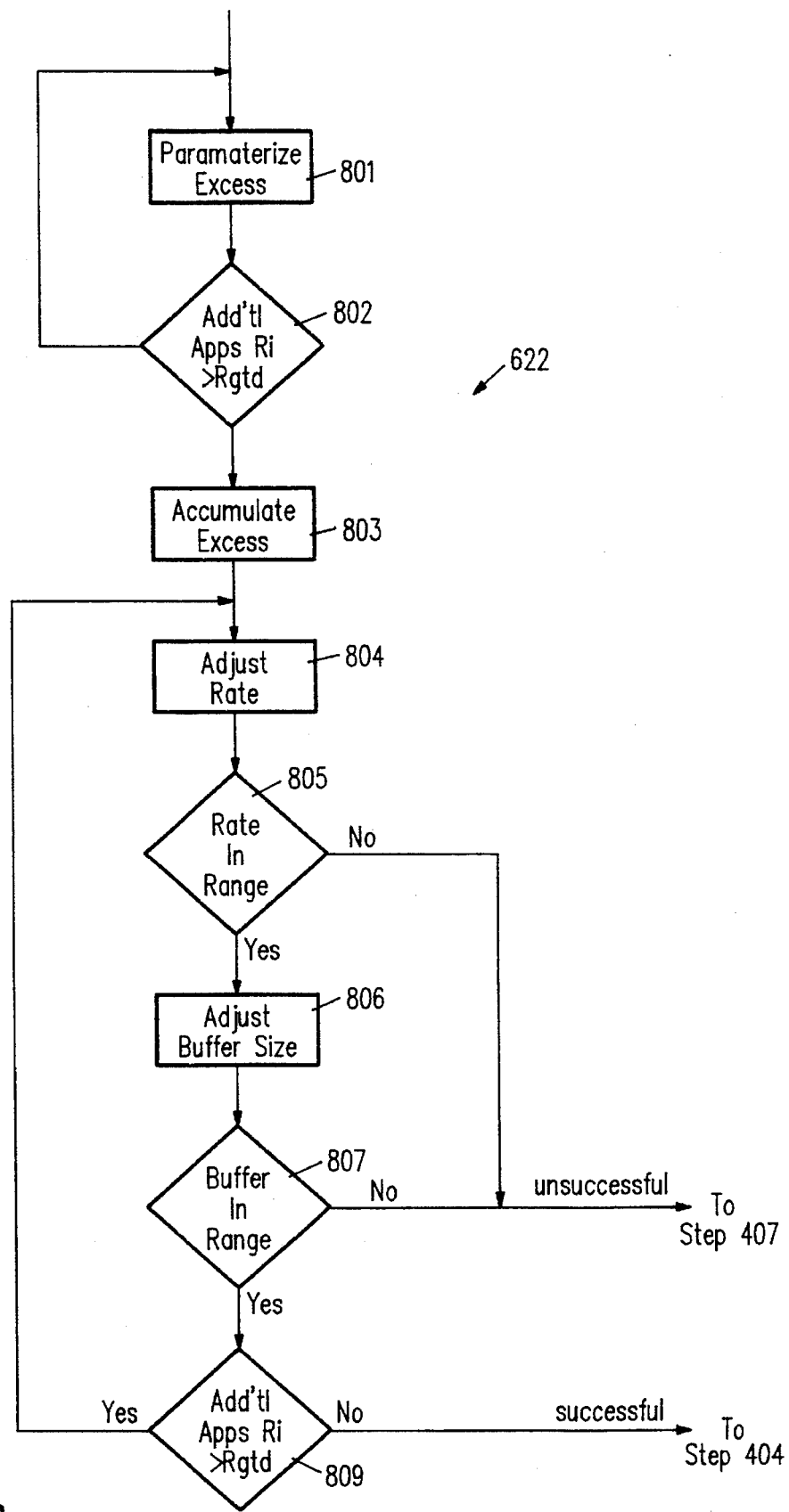
FIG. 8 is a more detailed process flow diagram for decrease rate step 622 within step 403 of this invention.

One embodiment of decrease rates step 622 is shown in more detail in FIG. 8. Applications 301_i with rates greater than or equal to guaranteed rate Rgtd_i are considered as candidates for decreasing the rates in step 622, i.e., applications 301_i in Classes 4 to 6. However, if previous processing reduced rate Rnew_i below guaranteed rate Rgtd_i for any application 301-i in Class 4, these applications are not processed in decrease rates step 622.

In parameterize excess step 801, parameter excess_i is generated by subtracting guaranteed rate Rgtd_i from new rate Rnew_i. Parameter excess_i is stored in memory. Parameterize excess step 801 transfers processing to additional applications step 802, which returns processing to step 801 if additional applications with new rate Rnew_i greater than or equal to guaranteed rate Rgtd_i remain to be processed and otherwise to step 803. Thus, upon completion of step 801, parameter excess_i is stored in memory for each application with new rate Rnew_i greater than or equal to guaranteed rate Rgtd_i.

Initially, in accumulate excess step 803, parameter sum_excess is stored as zero. Accumulate excess step 803 retrieves parameter sum excess from memory 313 and then sequentially retrieves each of the stored parameters excess_i and adds the retrieved parameter excess_i to the current value of parameter sum_excess. The resulting value of parameter sum_excess is then stored in memory 313. Upon completion, accumulate excess step 803 transfers processing to adjust rate step 804.

Recall, that as described above, two structures are used. At this point, the first structure has the old rates for applications 301-i in Classes 2 and 5 and the new rates for applications 301-i in Classes 1, 3, 4, and 6. The second structure has the old rates for applications 301-i in Classes 1, 3, 4, and 6. In adjust rate step 804 only the first structure is used. Here, new rate Rnew_i refers to the rate in the first structure at the start of step 804. New rate Rnew_i is processed to generate a revised new rate Rrnew_i which is then stored in the first structure.

Revised new rate Rrnew_i for application 301-i is generated by decreasing new rate Rnew_i by the fraction of the available channel capacity attributable to application 301_i. Specifically, $$Rrnew\_i = Rnew\_i - \frac{excess\_i}{sum\_excess} \times \Delta$$

After adjusting the rate, adjust rate step 804 transfers to rate in range step 805. Step 805 checks revised new rate Rrnew_i to ensure that revised new rate Rrnew_i is within a predetermined range, i.e., the change in the rate is a small decrement. In this embodiment, revised new rate Rrnew_i must be in the range of a lower rate bound and an upper rate bound, e.g.,:

$$s * (Rold\_i) \leq Rrnew\_i < Rold\_i$$

Again, the value of constant s was empirically chosen as 0.9.

If revised new rate Rrnew_i is not within the defined range, step 805 transfers processing to step 407, and conversely to adjust buffer size 806.

As explained above, to maintain a constant delay time through the system, a decrease in the rate of an application 301-i is accompanied by a proportional decrease in the effective buffer size of encoder 302-i. Thus, adjust buffer size step 806 determines a new effective buffer size. New effective buffer size "buf_sz_i" is equal to the product of revised new rate Rrnew_i and system delay time interval $\delta\_i$. Specifically, $$buf\_sz\_i = \delta\_i * Rrnew\_i$$

However, again the buffer size cannot be decreased arbitrarily. Hence, threshold max_buffer_i is compared with new buffer size buf_sz_i and processing transfers from step 806 to step 807.

In buffer in range step 807, if new buffer size buf_sz_i is less than maximum buffer fullness threshold max_buffer_i, processing transfers to step 407 and conversely to step 809. In test step 809, processing returns to step 804 if additional applications with new rate Rnew_i greater than or equal to guaranteed rate Rgtd_i remain to be processed and otherwise to build packet table step 404.

In the above embodiment of step 622, all applications with a rate R_i greater than or equal to guaranteed rate Rgtd_i were processed. This embodiment is illustrative only and is not intended to limit the invention to the particular set of applications. In another embodiment, an iterative process is used. Initially, only applications in Class 4 are processed as described above for step 622 and the decrease in channel capacity is compared with the excess capacity detected in step 621. If the decrease in capacity is more than the excess capacity, step 622 is complete. Conversely, if the decrease in capacity is less than the excess capacity, applications in Classes 4 and 5 are processed, and the decrease in capacity is determined. If the decrease in capacity for applications in Classes 4 and 5 is more than the excess capacity, step 622 is complete. Conversely, step 622 is performed exactly as described above with respect to FIG. 8. This method requires more time, but it may also improve the overall performance, if it is unnecessary to reduce the rate for applications in Class 6.

In one embodiment, modify rate step 403, as described above, is modified to reduce the complexity of the process at the cost of some performance efficiency. Specifically, the adjust buffer size steps are eliminated. The adjustment of the buffer size is not done until after all the rate determinations are completed. Then, when new rates are available for all applications, statistical multiplexer 300 performs a buffer size check, i.e., the buffer fullness check, for all those applications with a new rate that is less than the old rate. If an application fails to satisfy the buffer fullness requirement, the new rates for all the application are dropped and all the applications are assigned the old rates for the next period.

The embodiment of modify rates step 403 presented above assures every application 301-i, that has guaranteed rate Rgtd_i defined, receives a guaranteed number of bits per second to achieve a target distortion so that the application preferably is within Classes 2 and 5. Furthermore, if an application achieves its target distortion with a rate less than or equal to the guaranteed rate, this rate is not altered regardless of the performance of other applications. This means that if the target distortion level and guaranteed rate are chosen appropriately, statistical multiplexer 300 can assure performance at the requested distortion level. This permits control of performance on an individual application basis, which might be necessary in the case of premium and pay-per-view applications.

If performance control on an individual application basis is not necessary, modify rates step 403 can be simplified so as to force the applications to compete on a global basis. This can be done by setting the target distortion of all the applications equal to zero. In this way only a part of the process is performed, i.e., only process 610, in effect driving the system to a state where the (weighted) distortion values of all applications are approximately equal. Independent of the process used, at the end of step 403, a table is generated that contains the rates for each variable rate application for the next statistical multiplexer cycle. Alternatively, the table can contain the both the fixed and variable rates for the next statistical multiplexer cycle.

BUILD PACKET TABLE STEP 404

In build packet table step 404, in this embodiment, a particular process is used to organize the packet schedule table. Herein, the process is first considered generally and then specific applications of the process are considered. This process is only illustrative of one way to organize the packet schedule table and is not intended to limit the invention to this particular process.

In the process used in build table step 404, a selected interval of time, i.e., a window, containing an integer number E of packets is considered, i.e., E is the total number of packets that can be transmitted over communication channel 330 in the selected time interval. Statistical multiplexer 300 is handling L applications 301-1 to 301-L and for any application 301-i, the number of packets allocated over this window is m_i. At the start of step 404, the number of packets m_i required for each application over the selected time interval is known. An obvious constraint is that the total number of packets demanded by applications 301-1 to 301-L should not exceed the total available packets, i.e., $$\sum_{i=1}^{L} m\_i = E$$

The process of this invention assigns each packet to the application that is the most deserving at the time. The determination of which application is the most deserving is based on the number of packets already assigned to that application up to that point (actual allocation) in the window and the number of packets that the application should have been allocated up to that point (target allocation) in the window. Since packets should be uniformly distributed over the entire window, the target allocation for application 301-i up to packet time n is $$pt\_i(n) = (m\_i/E) * n.$$

In other words, this is the number of packets that the application 301-i should have received by the nth packet. Clearly, $$pt\_i(0) = 0$$

and $$pt\_i(E) = m\_i.$$

Let the actual number of packets allocated to application 301-i up to, but not including the nth packet, be denoted by $r\_i(n)$. A figure of merit $\zeta\_i(n)$ is used to determine which application is most deserving of the next packet. In this embodiment, figure of merit $\zeta\_i(n)$ is defined by:

$$\zeta\_i(n) = pt\_i(n) - r\_i(n) = (m\_i/E) * n - r\_i(n)$$

In other words, figure of merit $\zeta\_i(n)$ is determined for each of the L applications, and the nth packet is allocated to the application having the largest positive figure of merit $\zeta\_i(n)$. Any remaining packets are inserted as idle packets. By repeating this operation for each packet, packets are distributed to all L applications in a reasonably uniform manner, i.e, the packet schedule table is generated.

In one embodiment, figure of merit $\zeta\_i(n)$ is not used because it requires a divide and a multiply which is slow when implemented in hardware. Rather, an equivalent figure of merit is used that does not require the divide and so the packet schedule table can be generated very quickly in hardware.

Specifically, new figure of merit $\eta\_i(n)$ is obtained by multiplying figure of merit $\zeta\_i(n)$ by the number E of packets in the window, i.e., $$\eta\_i(n) = E * \zeta\_i(n) = (m\_i * n) - (E * r\_i(n)).$$

Figure 9:
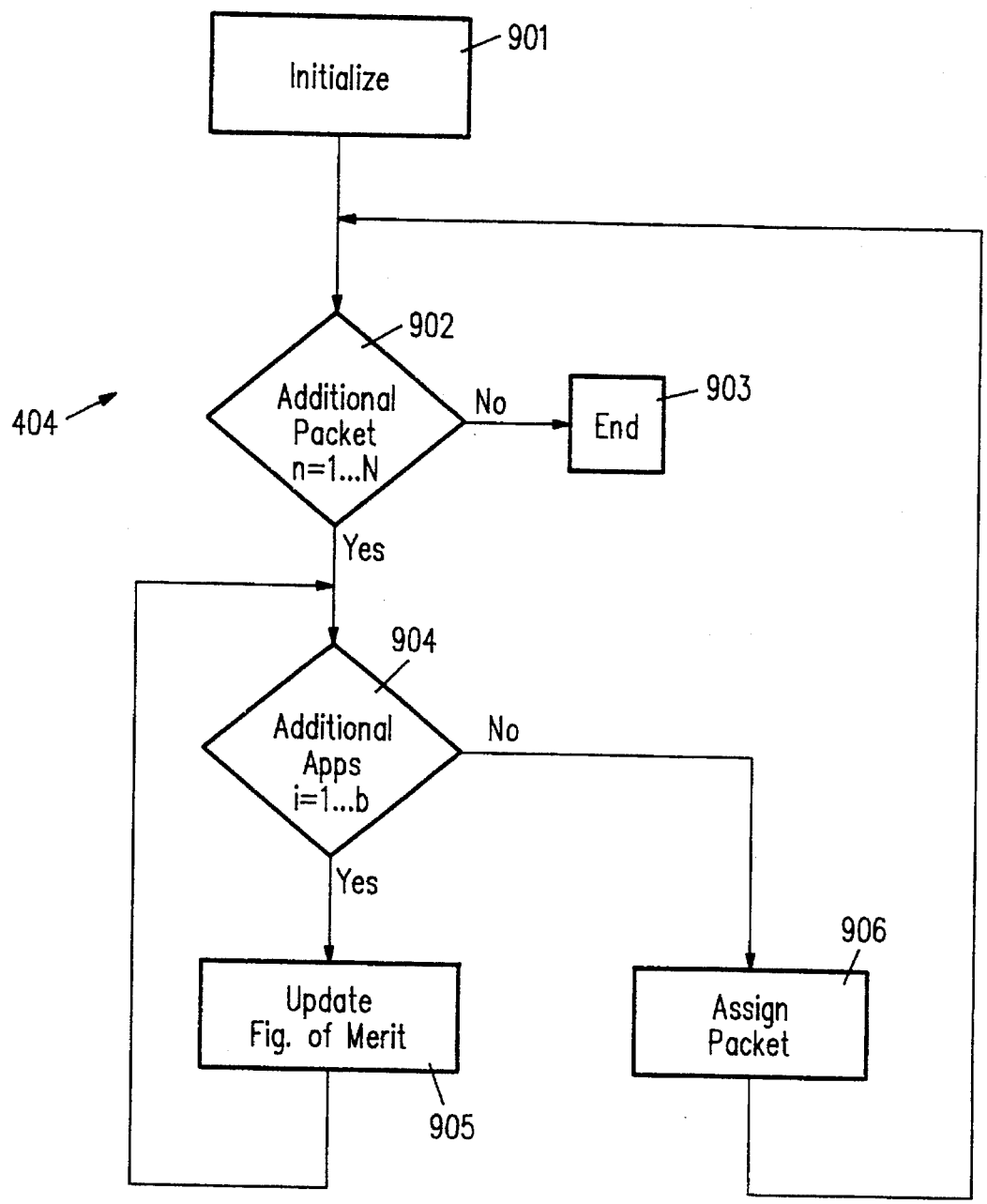
FIG. 9 is a more detailed process flow diagram for build packet table step 404 of this invention.

The packet schedule table is built by executing the process illustrated in FIG. 9. In initialization step 901, figure of merit $\eta\_i(n)$ is set to zero for each application:

$$\eta\_i(n) = 0, \text{ for } i = 1, \ldots, L$$

Alternatively, figure of merit $\eta\_i(n)$ is set to m_i for each application. Also, index n for the current packet number is set to zero as is index i for the current application. Upon completion of initialization step 901, processing transfers to additional packet check step 902.

Additional packet check step 902 increments current packet index n and then checks index n to determine whether index n is greater than total number of packets E. If index n is less than or equal to total number of packets E, processing transfers to additional application check step 903 and otherwise step 404 ends.

Additional application check step 904 increments current application index i and then checks index i to determine whether index i is greater than total number of applications L. If index i is less than or equal to total number of applications L, processing transfers to update figure of merit step 905 and otherwise to assign packet step 906.

In update figure of merit step 905, figure of merit $\eta\_i(n)$ is first generated. Next, number of packets m_i allocated over this window to application 301-i is added to figure of merit $\eta\_i(n)$ and processing returns to additional application step 904. Notice that this repetitive addition effectively forms the product n * (m_i) in figure of merit $\eta\_i(n)$.

When figure of merit $\eta\_i(n)$ has been updated for all L applications, processing transfers from additional application step 904 to assign packet step 906. In assign packet step 906, the application with the largest positive figure of merit $\eta\_i(n)$, is assigned packet n, i.e., a pointer to the encoder for the application assigned packet n is put in the packet schedule table at location n. The pointer is an address that identifies the encoder.

If there is a tie, i.e., two or more applications have the largest positive figure of merit $\eta\_i(n)$, the application with the largest number of packets m_i allocated over this window is assigned packet n. In another embodiment, the application with the smallest number of packets m_i allocated over this time interval is assigned packet n. Of course, other tie-breaking rules could also be used. If no figure of merit $\eta\_i(n)$ is greater than zero, the packet is tagged as an idle packet. After packet n is assigned, total number of packets E is subtracted from figure of merit $\eta\_i(n)$ for the application assigned packet n.

If the sum of allocated packets is equal to the number E of packets transmitted in a window, there are no idle packets. However, if idle packets are desirable or if there are more entries in the packet schedule table than the sum of the allocated packets, an idle source can be defined with its own allocation of packets m_j and so in each window m_j packets are transmitted as idle packets.

Upon completion of assign packet step 906, processing returns to additional packet check step 902 and the process is repeated as described above until each of total number of packets E has been assigned either to an application or as an idle packet. When all E packets have been assigned build packet table step 404 is complete.

The above description of build packet table step 404 generates a completely new packet schedule table for each window. Statistical multiplexer 300 has to schedule packets for applications operating with both variable and fixed rates. Although variable rate applications demand a new packet schedule table for every window, statistical multiplexer 300 must ensure that the fixed rate applications also get their required share of packets.

For any variable rate application 301-i, the number of packets allocated over the window is m_i, where the number of packets allocated for a particular variable rate application 301-i is defined by multiplying the rate in packets per second for application 301-i from the table generated in step 403 by the size of the window in seconds and truncating the product to the largest integer value that is less than this product. Similarly, for each fixed rate application 301-j, the number of packets allocated over the window is m_j, where the number of packets allocated for a particular fixed rate application 301-i is defined by multiplying the rate in packets per second for application 301-j provided by system supervisor 340 in step 401 by the size of the window in seconds and truncating the product to the largest integer value that is less than this product. Alternatively, to eliminate the truncation error, the number of packets m_i allocated over the window for variable rate application 301-i is determined directly in step 403 and the number of packets m_j allocated over the window for fixed rate application 301-j is provided directly by system supervisor 340. The number of packets required for each fixed rate application in a window is combined with number of packets required for the variable rate applications and used in building the packet schedule table for the next window, in one embodiment. This can be done during each window. In other words, the packet schedule table is built for all the applications afresh in each window.

This approach is preferred if only a few fixed rate applications, e.g., less than five, are being handled by statistical multiplexer 300. However, the number defined as "a few fixed rate applications" depends on the processor utilized in statistical multiplexer 300. The greater the power of the processor, the larger the number of fixed rate applications that can be considered as a few fixed rate applications.

However, typically the number of applications connected to a single statistical multiplexer 300 is quite large——typically of the order of several tens. Most of these applications are fixed rate applications. In this situation, it is grossly inefficient to update the packet schedules, i.e., packet schedule tables, frequently. In addition to the fact that the majority of the applications are fixed rate, some of the fixed rate applications may operate at very low rates so that these applications do not need packets in every window. For example, if there are six statistical multiplexing windows in a second and a fixed rate application requires only two packets per second, statistical multiplexer must keep track of which of the six windows to send a packet for this application. This adds to the overall complexity.

Hence, in one embodiment, two packet schedule tables, i.e., a static packet table, that is sometimes called a static table, a primary packet table, and a primary table, and a dynamic packet table, that is sometimes called a dynamic table, a secondary packet table and a secondary table, are utilized. The static packet table is built once, during configuration time in step 401, and covers a relatively large interval of time, e.g., about one second. Hence, in this embodiment, process 404, as illustrated in FIG. 9 and described above, is used to build the static table within initialization step 401. The specified rates for the fixed-rate applications and the initial rates for the variable rate applications are used in the process to generate the number of packets m_i to be allocated over the interval for each application 301-i.

If a packet n is allocated to a fixed rate application in the process, that application's pointer is inserted against packet number n in the static packet table. However, if packet n is allocated to a variable rate application in the process, a predetermined code, called a "null" code, is inserted against packet number n in the static packet table. Once built in initialization step 401, the static packet table is not altered until the following re-configuration time.

The particular way that packets are allocated within the static table is not a critical part of the invention. Any number of ways can be used. For example, all the variable rate applications can be considered as one pseudo-application. The total allocation for the pseudo-application is the sum of the allocations for all the variable rate applications. The packet scheduling is done for F+1 applications, where F is the number of fixed rate applications and the one is the pseudo-application. In this embodiment, the positions in the static table assigned to the pseudo-application have a null code inserted while the other positions have the pointer for the fixed rate application inserted.

The dynamic packet table is built every window in build packet table step 404 using the new rates for the variable rate applications. However, the number of packets in the dynamic packet table is not the total packet number N but rather the total number of packets allocated to all the variable rate applications in a statistical multiplexer period.

Process 404, as illustrated in FIG. 9, is utilized to generate the dynamic packet table using the redefined number of total packets available in the window instead of total number of packets N. Again, the particular packet scheduling method used to allocate packets within the static and dynamic tables is not a critical part of the invention. One important aspect is that the static table is configured once at configuration time with null codes inserted for the variable rate applications and the dynamic table is updated, i.e., populated, for the variable rate applications once per window. The use of the dynamic and static tables is given below in the description of FIG. 18.

The size of a statistical multiplexing period, i.e., a window, is not fixed and can change with time. Consequently, the number of entries in the dynamic table in step 404 for the next window is not fixed and can change from window to window. In this embodiment, a constraint on the window size is that the window must be large enough so that a predetermined number of distortion values, e.g., three, are collected by statistical multiplexer 300 from each variable rate encoder during the window. In addition, the predetermined number of distortion values collected can vary from window to window.

As explained above, in this embodiment, the dynamic table is limited to no more than 192 entries. Typically, the total number of packets allocated to all variable rate applications in a window is much greater than 192. Thus, when all the entries in the dynamic table have been accessed, statistical multiplexer 300 loops from the last entry to the first entry and begins sequentially accessing the entries again. Thus, the 192 entry dynamic table is repetitively used until the end of the window.

The switch, that is described more completely below, from one dynamic table to another is made during the time period when statistical multiplexer 300 has accessed the last entry in the table and is looping back to the first entry, i.e, after the switch, statistical multiplexer 300 accesses the first entry of the other dynamic table.

PASS RATES STEP 405

In pass rates step 405, statistical multiplexer 300 passes the new rates used to generate the new dynamic table in step 404 to each of encoders 302-i that are processing a variable rate application 301-i. The new variable rate for each encoder 302-i is written to the general communications table and communicated to the encoder using the process described above. All of the rate decreases are sent first and a timer is started. In this embodiment, the timer is a thirty-four millisecond timer. The timer is used to determine the completion of one picture period after completion of the sending of the rate decreases. This interval is selected to insure that the rate decreases are implemented by the encoders prior to the rate increases. When the timer times out, the rate increases are sent to the appropriate encoders 302-i. Upon completion of the transfer of the new rates used to generate the new dynamic table, processing transfer from step 405 to switch rate step 406.

SWITCH RATE STEP 406

Switch rate step 406 is constrained by hardware in encoder 302-i. Typically, it is not possible to alter the internal rate control of encoder 302-i once encoder 302-i has begun encoding a picture. Therefore, the following discussion of switch rate step 406 assumes that a rate switch in encoder 302-i occurs at the first picture boundary following receipt of the new rate by encoder 302-i. If an encoder 302-i requires more time than the first picture boundary, the time periods in the following discussion must be lengthened appropriately. Similarly, if an encoder 302-i has the capability to implement a new rate within a picture, the time periods in the following discussion could be shortened. In view of this disclosure, the required modifications based on performance of encoder 302-i will be apparent to those skilled in the art. Of course, if the encoders can change rates at any time and not just at frame boundaries, for example, the switching interval, as defined below, can be reduced to zero.

Hence, in this embodiment, rate alterations are permitted only between pictures, i.e., at the start of a picture. Furthermore, picture boundaries of statistically multiplexed applications 302-i are not guaranteed to occur at the same time instant. These two constraints operate in tandem. Since the rate of an application 301-i within a picture can not be changed, the new rate for application 301-i can not be implemented until the next picture boundary. However, when application 301-i reaches a picture boundary, some other application 301-j may not be at its picture boundary. Hence, new rate R_j for application 301-j can not be implemented at the picture boundary for application 301-i. In other words, it is not possible to alter the rates of all the applications and alter the multiplexer packet schedule at the same instant.

Figure 10:
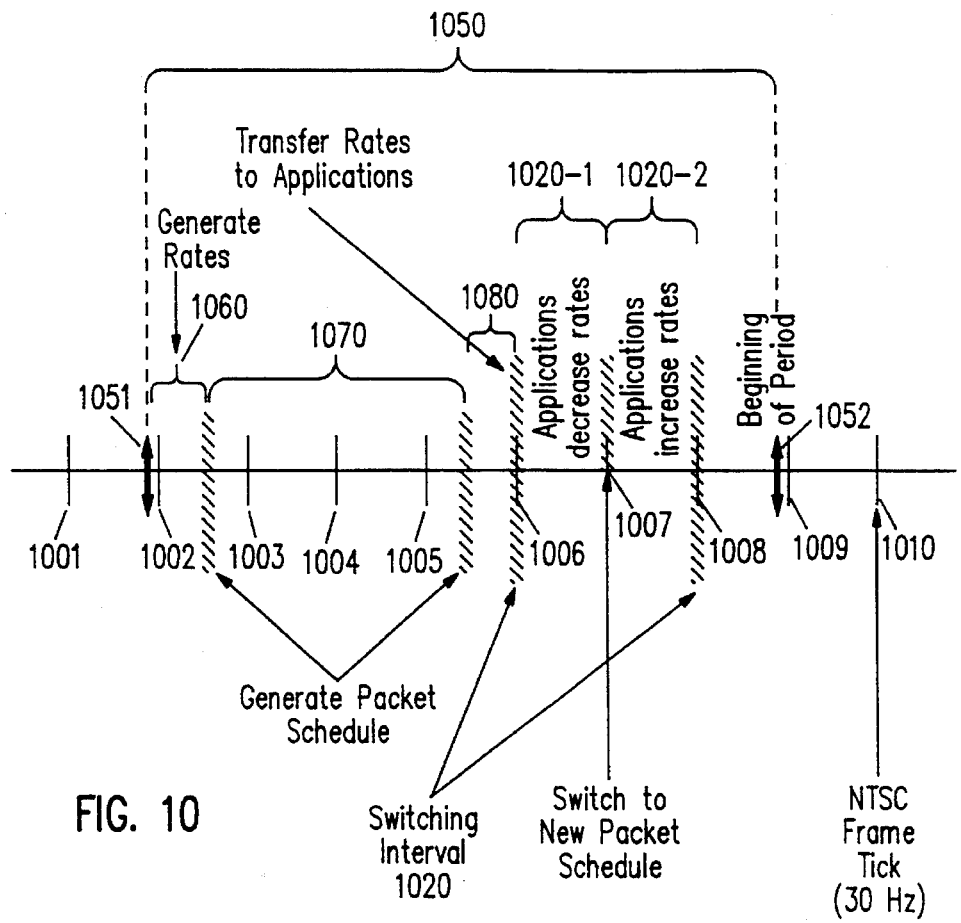
FIG. 10 is a time line for one embodiment of the process of FIG. 4.

The solution to this problem is not to perform the switch to the new rates of all applications 301-i and to the new packet schedule at the same time instant, but to perform the switch over a non-zero interval of time, referred to as switching interval 1020 (FIG. 10). Switching interval 1020 is chosen such that all applications 301-i are guaranteed to have at least one picture boundary within switching interval 1020. In FIG. 10, tick marks 1001 to 1010 represent frame boundries which in the case of NTSC input have a frequency of 30 Hz, actually 29.97 Hz. Window 1050 starts at arrow 1051 and ends at arrow 1052. Modify rates step 403 is completed over time interval 1060. Build packet table step 404 is completed over time interval 1070 and pass rates step 405 over time interval 1080. The length of switching interval 1020, in this case, is 2/29.97 seconds.

Applications switch rates at the first picture boundary encountered within switching interval 1020. Specifically, all applications whose new rate is lower than the old rate perform the rate switch first over first half interval 1020-1. Then, at the center of the switching interval, statistical multiplexer 300 switches to the new packet schedule. Finally, all applications, whose new rate is higher than the old rate, perform the switch in second half interval 1020-2.

This process ensures that at no instant is the sum of all the applications' rates greater than the capacity of communication channel 330. However, there is a slight drop in channel utilization during first half interval 1020-1, because some applications may operate at a rate that is lower than the rate at which they would be serviced by statistical multiplexer 300. Specifically, in first half interval 1020-1, the rate for some applications may be decreased, i.e., the encoders for these applications start compressing at a lower rate than the old rate. However, until statistical multiplexer 300 implements the new packet schedule table, statistical multiplexer 300 continues to service the applications with lower rates at their old higher rates. This effect results in some underutilization of communication channel 330.

In FIG. 10, the ticks marked are used by statistical multiplexer 300 for reference purposes and are not locked to any of the applications per se. Further, it is assumed that every application completes coding each frame in the interval bounded by two adjacent ticks, i.e., in 1/29.97 seconds. If the frame rate of any application is less than 29.97 Hz (e.g., if it is a film sequence at 23.97 Hz), even then it is assumed that the encoder compresses each frame in 1/29.97 seconds and idles at certain other times to synchronize with the input data rate.

Statistical multiplexer 300 operates in a cyclic manner with the events within period 1050 being continually repeated. The length of period, as shown in FIG. 10, is not indicative of any real time performance. Indeed, the only conclusion that should be drawn from this figure (and the next) regarding timing is that the bulk of the time during a statistical multiplexer period is spent in building the packet schedule table and that the other aspects of this invention are executed in a relatively short time. The actual time required to execute each process of this invention is dependent on the computational power available in statistical multiplexer 300. However, note that there is a minimum value beyond which the period cannot be decreased because, at the least, the period should include switching interval 1020, which is 2/29.97 seconds long.

Figure 11:
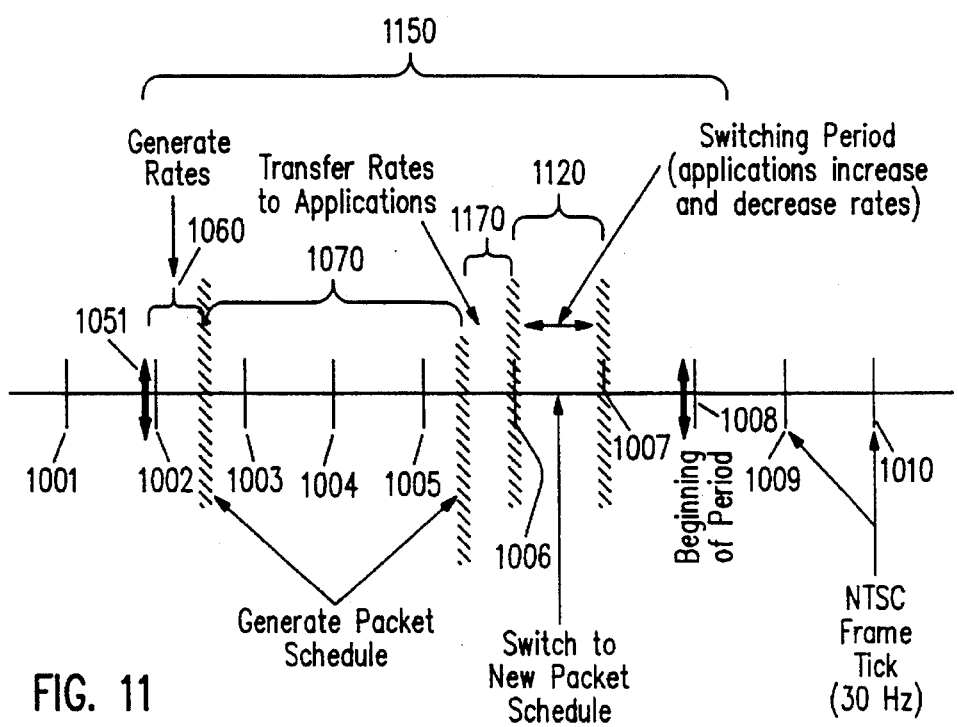
FIG. 11 is a time line for another embodiment of the process of FIG. 4.

FIG. 11 illustrates an alternative implementation with a shorter period 1150. In this embodiment, the encoder and decoder buffer sizes are "large enough", that the switching interval contains exactly one picture boundary of each application. The applications perform the switch to a higher or lower rate when they reach their picture boundary and statistical multiplexer 300 switches to the new packet schedule at the center of switching interval 1160. In this case, some applications may switch to a higher rate before the new packet schedule gets switched causing their buffer fullness to increase slightly. However, if the buffer sizes are large enough this should not be a problem, although extreme care needs to be taken to ensure proper tracking of the buffer status.

As explained above, the distribution of rates amongst all variable rate applications 301-i is based on their respective distortion D_i. In the above discussion, distortion D_i was assumed known. In fact, distortion D_i must first be defined and then data generated to determine distortion D-i as defined for each application.

Ideally, distortion D_i should be such that it incorporates the characteristics of the Human Visual System (HVS). Broadly speaking, the HVS is more sensitive to distortion artifacts in areas of low spatial and temporal activity. Low spatial activity means relatively flat areas in a frame. Low temporal activity means relatively less frame-to-frame movement. In other words, the same "amount" of distortion artifact is more easily visible to the human eye if the distortion occurred either in relatively flat regions of an image, or during a relatively still portion of a video sequence than if the same amount of distortion occurred in areas of high spatial details of the image or during high motion of a video sequence. The word "amount" refers to some absolute error measurement between the reconstructed and original video frames, e.g., a mean-squared-error (mse) measurement. Thus, distortion D_i preferably takes into account the spatial and temporal characteristics of a video sequence.

In general, a HVS based distortion metric is complicated to compute in real time hardware. So a simplified definition of distortion D, which is still quite functional and is implemented in the hardware of this invention, is defined as:

$$D = P \times \frac{(IF)}{(SA)} \times \frac{mse}{(TA)}$$

where
mse=Mean-squared error,
IF=Interlace Factor,
SA=Frame Spatial Activity,
TA=Temporal Activity, and P=Priority Number.

Priority number P was defined above, and that definition is incorporated herein by reference. The particular methods used to determine the interlace factor, frame spatial activity, and temporal activity as well as the expression for distortion are not critical to the invention. The important aspect is that a uniform methodology be used for determining distortion D_i or some other parameter that is indicative of the quality of the encoded data. The principles of this invention can be applied to any compression technology and the particular parameter used to measure quality can be different from technology to technology and even within a given technology. Therefore, the following examples of the mean-squared error, interlace factor, frame spatial activity and temporal activity are illustrative only and are not intended to limit the invention to the particular examples.

Mean-squared error mse is generated by summing the square of the pixel-to-pixel difference between the original frame and the frame reconstructed after encoding it and normalizing by the total number of pixels in the frame, i.e., $$mse = \frac{1}{n} \sum_{i=0}^{n-1} (x\_i - y\_i)^2$$

where $x\_i$ and $y\_i$ are the pixels of the original and reconstructed frames, respectively, and here, n is the total number of pixels in the frame. Note that mean-squared error mse is completely independent of the characteristics of the input sequence. In this embodiment, each encoder 302-i generates mean-squared error mse once per frame and that value is passed to statistical multiplexer 300. In another embodiment, the mean-squared error is not used, but rather an estimate of the mean-squared error that is generated by the encoder that is provided by C-Cube Microsystems of Milpitas, Calif. is used.

Interlace factor IF in distortion D is used to normalize the effects of interlacing in video sequences. Typical video encoders compress a sequence of pictures without regard to the field/frame structure of the sequence. However, the characteristic of frames originating from a video camera (typically at 50 or 60 fields/second) is different from that originating from a film source and converted to digital format (assuming that any 3:2 pulldown operations have been reversed). The former has what is commonly called "interlace artifacts" while the latter does not. Interlace artifacts are nothing more than motion between the two fields of a frame which is introduced because the two fields were captured at different time instants. Such inter-field motion does not exist between the fields of a frame originating from a film sequence because the two fields in this case are captured at the same time instant. It is for this reason that a typical video frame is harder to compress than a typical movie frame.

As explained above, statistical multiplexer 300 uses the relative distortion values of different applications to redistribute rates. For such a process to work efficiently, the method used to determine distortion D must be unbiased. However, since a video encoder typically operates on a frame grid, the spatial activity calculated for an application becomes somewhat inflated if the application is an interlaced video sequence. This results in a lower than normal value for the distortion. This bias can be offset by re-scaling the spatial activity measure by interlace factor IF. If it is known in advance that a particular frame is encoded in field mode, the interlace factor IF for that picture can be sent to one.

In this embodiment, interlace factor IF is generated using two statistics, i.e., a "Difference activity" DA and an "Intra activity" IA. Difference activity DA is defined as the average absolute pixel-to-pixel difference between the two fields belonging to a frame, i.e., $$DA = \frac{1}{nf} \sum_{i=1}^{nf} |u\_i - v\_i|$$

where nf is the number of pixels in a field, and (u_i) and (v_i) are corresponding pixels of the odd and even fields of the frame, respectively.

In one embodiment, a difference accumulator generates difference activity DA between two successive fields of different parity. Specifically, differential accumulator sums the absolute differences between a pixel of the current field, e.g., field a1, and the same pixel of the next field of a different parity, e.g., field a2. When all the data for a frame has been processed, encoder 302-i provides difference activity DA to statistical multiplexer 300 once per frame.

Intra activity IA is the average absolute pixel-to-pixel difference between each even-odd pair of lines belonging to one field, averaged over both fields of the frame, i.e., $$IA = \frac{1}{nf} \sum_{i=1}^{nf} [|p_i^{odd} - q_i^{odd}| + |p_i^{even} - q_i^{even}|]$$

where $p^j_i$ and $q^j_i$ are the corresponding pixels from adjacent even-odd lines of field j, j=odd, even.

In one embodiment, a difference accumulator generates a difference measure between every adjacent odd-even line pair belonging to the same field. Specifically, difference measure "intra activity IA" is obtained by summing the absolute differences between pixel pairs belonging to the even and odd lines from the same field. Pixel differences are obtained between the following line pairs (0,1), (2,3), (4,5), ... The pixel values for even numbered lines are passed to a delay line and then to the differential accumulator, while the pixel values for odd number lines are passed directly to the differential accumulator. When all the data for a frame has been processed, and the intra activity IA is provided by encoder 303 to statistical multiplexer 300 once per frame.

Once difference activity DA and intra activity IA are available, interlace factor IF is defined as:

*IF=max (1, min ((DA/IA),2)).*

Both difference activity DA and intra activity IA are generated in hardware. Notice that since the ratio of the two statistics is used, the hardware does not need to use number of pixels nf. Hence, both statistics are implemented using a differential accumulator, as described above.

Frame spatial activity SA in distortion D is a measure of the spatial activity in a frame. An example of such a measure is the average absolute difference between adjacent vertical and horizontal pixels. One embodiment of a hardware implementation of a frame spatial activity SA suitable for use in this invention is available from C-cube Microsystems of Milpitas, Calif..

The important aspect in selecting hardware to generate frame spatial activity SA is that as long as the spatial activity is measured on a frame grid (i.e., pixel differences between adjacent lines of a frame are being taken into account), frame spatial activity SA has to be adjusted by interlace factor IF.

Temporal activity TA in distortion D is an indicator of frame-to-frame differences in the video sequence. First the average absolute difference between corresponding pixels of two adjacent frames is determined, i.e., $$V = \frac{1}{n} \sum_{i=1}^{n} |x_i - y_i|$$

where, as before, n is the total number of pixels in a frame, and $x_i$ and $y_i$ are, respectively, the corresponding pixels of two adjacent frames. V' is used to recursively update a parameter, v, as follows.

$$v = \alpha v + (1-\alpha)V'$$

In one embodiment, constant α is 0.9 and parameter v is initially set to 40.

Finally, in this embodiment, temporal activity TA is obtained from v as $$1, v \leq 10$$

$$1 + \frac{v}{100}, 10 < v \leq 100$$

$$2 + \frac{v}{100}, 100 < v$$

Any other function may also be used as long as the function is based on a frame to frame pixel difference.

In the current implementation, both v and V' are computed in the encoder and transferred to statistical multiplexer 300 once per frame.

Figure 12:
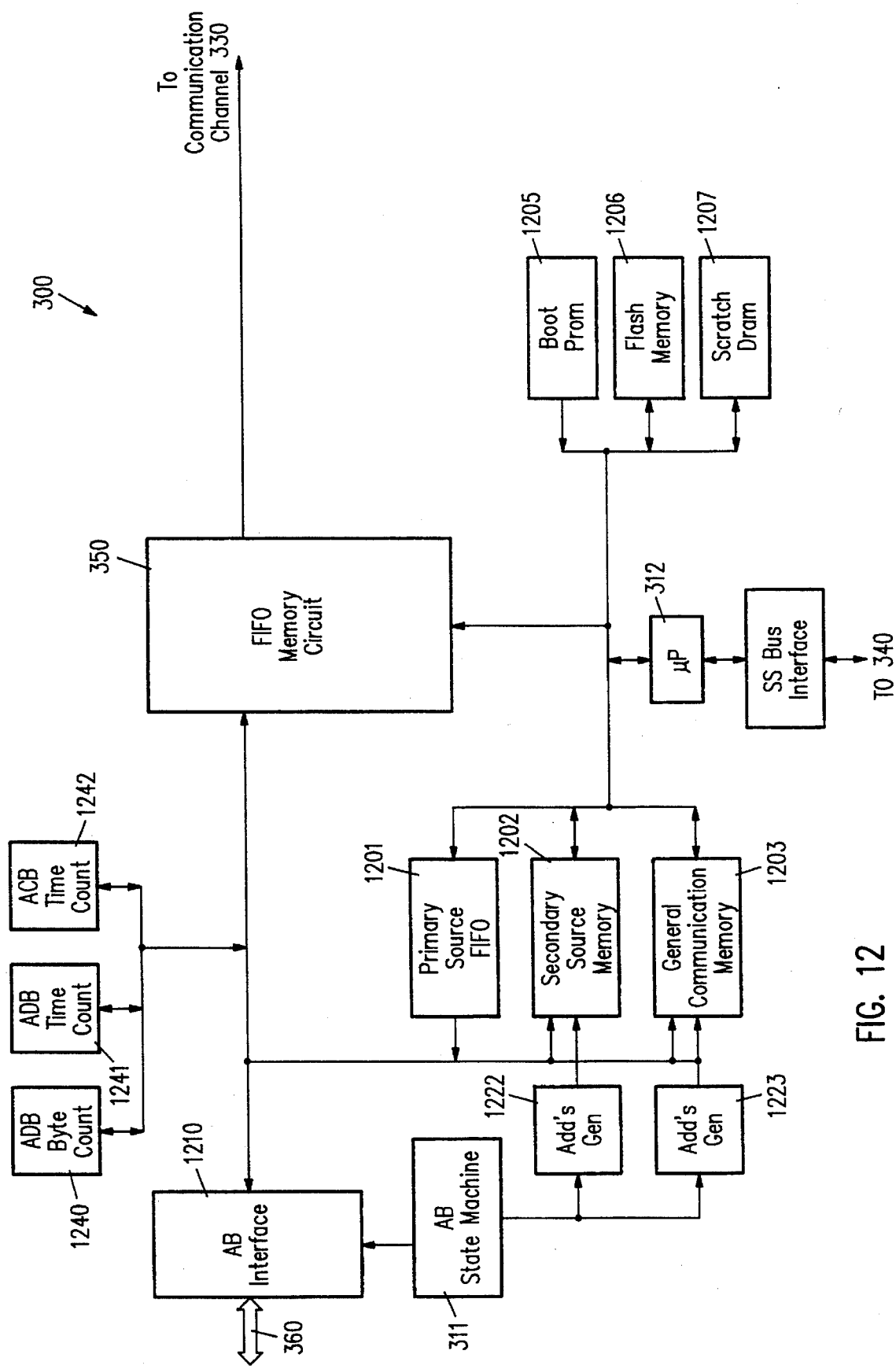
FIG. 12 is a detailed block diagram of the hardware in the statistical multiplexer of this invention.

A more detailed block diagram of one embodiment of statistical multiplexer 300 is presented in FIG. 12. Statistical multiplexer 300 communicates with encoders 302-1 to 302-L and collects compressed application data for transfer to communication channel 330 using application control bus 360. In this embodiment, memory 313 (FIG. 3) includes a plurality of memories 1201 to 1203 and memories 1205 to 1207, each of which are described more completely below.

In one embodiment, statistical multiplexer 300 supports four distinct application control buses through application control bus interface circuit 1210. Multiple application control buses allows redundant applications 301-i to connect to statistical multiplexer 300 over redundant application control buses 360. If one of the redundant applications fails in a mode that corrupts its application control bus, another of the redundant applications can still send data to statistical multiplexer 300 over one of the other three application control buses.

All four application control buses are driven in parallel with each application control bus having it's own set of drivers. Signals received from all four application control buses are logically "ORed" together in interface circuit 1210. Any application control bus can be disabled if a problem occurs with that application control bus.

Application control bus state machine 311 is positioned between application control bus interface circuit 1210 and microprocessor 312. In one embodiment, the functions described below of application control bus state machine 311 are implemented in a programmable gate array. Application control bus state machine 311, hereinafter ACB state machine 311, controls application control bus 360 through interface circuit 1210 and so minimizes the effect of bus operations on microprocessor 312, which in one embodiment is a Motorola 68302 microprocessor.

ACB state machine 311 is controlled by tables stored in memories 1201 to 1203 and 1207 and registers in state machine 311, both of which are configured by microprocessor 312. Tables used to control ACB state machine 311 include, in one embodiment, a static rate table stored in scratch DRAM 1207, a dynamic rate table stored in dual port memory 1202, and a general communication table stored in dual port memory 1204, each of which are described more completely below. ACB state machine 311 addresses memories 1202 to 1203 using address generator circuits 1222 to 1223 respectively. Of course, those skilled in the art will appreciate that address generator circuits 1222 to 1223 could be included within state machine 311.

The ACB state machine registers, that are written to by microprocessor 312 are registers ACBSMCtr, ACBSMMask, and ACBSMClr. These are eight bit registers and the bit definitions for registers ACBSMCtr and ACBSMMask are given in Tables III and IV. Writing to register ACBMSMCLr clears pending interrupts even if an interrupt is masked.

TABLE III

| Name | Bit |
|---|---|
| Reset | 0 |
| StComm | 1 |
| StFIFO | 2 |
| Reserved | 4,3 |
| NeedSel | 5 |
| SecSel | 6 |
| ComSel | 7 |

When bit Reset is low, ACB state machine 311 is reset. ACB state machine 311 can not operate when bit Reset is low. Microprocessor 312 must set bit Reset to zero and then to one to affect a reset of ACB state machine 311.

Bit StComm is set by microprocessor 312 when microprocessor 312 has programmed one of the general communications table and is ready for ACB state machine 311 to make a transfer. Bit StComm is cleared when ACB state machine 311 reaches an entry in the general communications table that is off.

Bit StFIFO is set by microprocessor 312 when the new primary table has been generated, and begun the DMA transfer of this table into FIFO 1201. When bit StFIFO is low, ACB state machine 311 can not perform the primary status message cycles described below, but ABC state machine 311 can perform the other application bus message cycles, described below.

Bits reserved must always be set low.

Bit NeedSel defines which of the two secondary tables in memory 1202 to use, as described below. When bit NeedSel is set low, ACB state machine 311 bit uses secondary table one.

Bit SecSel is not used.

Bit ComSel defines which general communication table in memory 1204 to use. When ComSel is set low ACB state machine 311 uses general bit communication table one.

TABLE IV

| Name | Bit |
|---|---|
| CommMask | 0 |
| VarMask | 1 |
| EmtyFIFOMask | 2 |
| ACBTimeMask | 3 |
| AppBus | 7–4 |

Clearing bit CommMask disables the interrupt normally generated when ACB state machine 311 reaches the end of data in the general communication table.

Clearing bit VarMask disables the interrupt normally generated when ACB state machine 311 reaches the end of the secondary table.

Clearing bit EmtyFIFOMask disables the interrupt normally generated when FIFO 1201 becomes empty.

Clearing bit ACBTimeMask disables the interrupt generated when ACB time counter 1242 times out. In this embodiment, this interrupt is not used and so this bit is set low.

Bit AppBus enables application buses four to one respectively. When a particular bit is set, the corresponding bus is enabled.

Application control bus 360 includes an eight-bit parallel address/data bus ADDR/DATA, an address strobe line AS, a data strobe line DS, a clock line CLOCK, a data clock or return clock line DTACLK, and an enable signal line ENABLE. The signals on these lines are differential TTL signal levels in this embodiment. Moreover, for convenience, the same reference numeral is used for a line and for a signal on that line. The application control bus 360 also includes reference clock and reference count lines that carry differential ECL level signals in this embodiment.

Application control bus 360 is the only communication path between statistical multiplexer 300 and encoders 302-1 to 302-L. Transfer of information on application control bus 360 is divided into packet time intervals, where a packet time interval is defined as the time required to transmit one packet of data over communication channel 330. The time interval between the rising edges of two consecutive pulses 1301 and 1302, i.e., packet strobes, on packet strobe line PS (FIG. 13) defines the packet time interval. In this embodiment, communication channel 330 provides an external clock signal EXCLK. External clock signal EXCLK is divided down by statistical multiplexer 300 to generate the packet strobes on line PS. Hence, a packet strobe is generated by dividing clock ticks on external clock line EXCLK by the number of bits in a packet. Packet strobes are very accurate, very regular pulses.

In this embodiment, statistical multiplexer 300 has two sections that run synchronously to one another. Application control bus 360 runs at 10 MHz. The statistical multiplexer output to communication channel 330 runs synchronously to external clock signal EXCLK received from communication channel 330, e.g., from a modem that drives the channel. These frequencies allow each portion of statistical multiplexer 300 to run optimally. This eliminates problems that would occur by requiring application control bus 360 to run at varying frequencies as the frequency of external clock signal EXCLK is changed.

In one embodiment, every packet time interval is divided further into a message cycle interval ACB (FIG. 13) and a data transfer interval ADB on application bus 360. Data transfer cycle interval ADB is used by statistical multiplexer 300 when collecting compressed application data for transfer to communication channel. Message cycle interval ACB is used by statistical multiplexer 300 for collecting information from encoders 302-1 to 302-L, and for distributing new rates to each of encoders 302-i that process variable rate applications.

Control and data transfer cycles within intervals ACB and ADB are time-multiplexed on data bus DATA/ADR within application control bus 360. In one embodiment, a plurality of messages cycles occur within interval ACB followed by one data packet transfer cycle within interval ADB.

Figure 13:
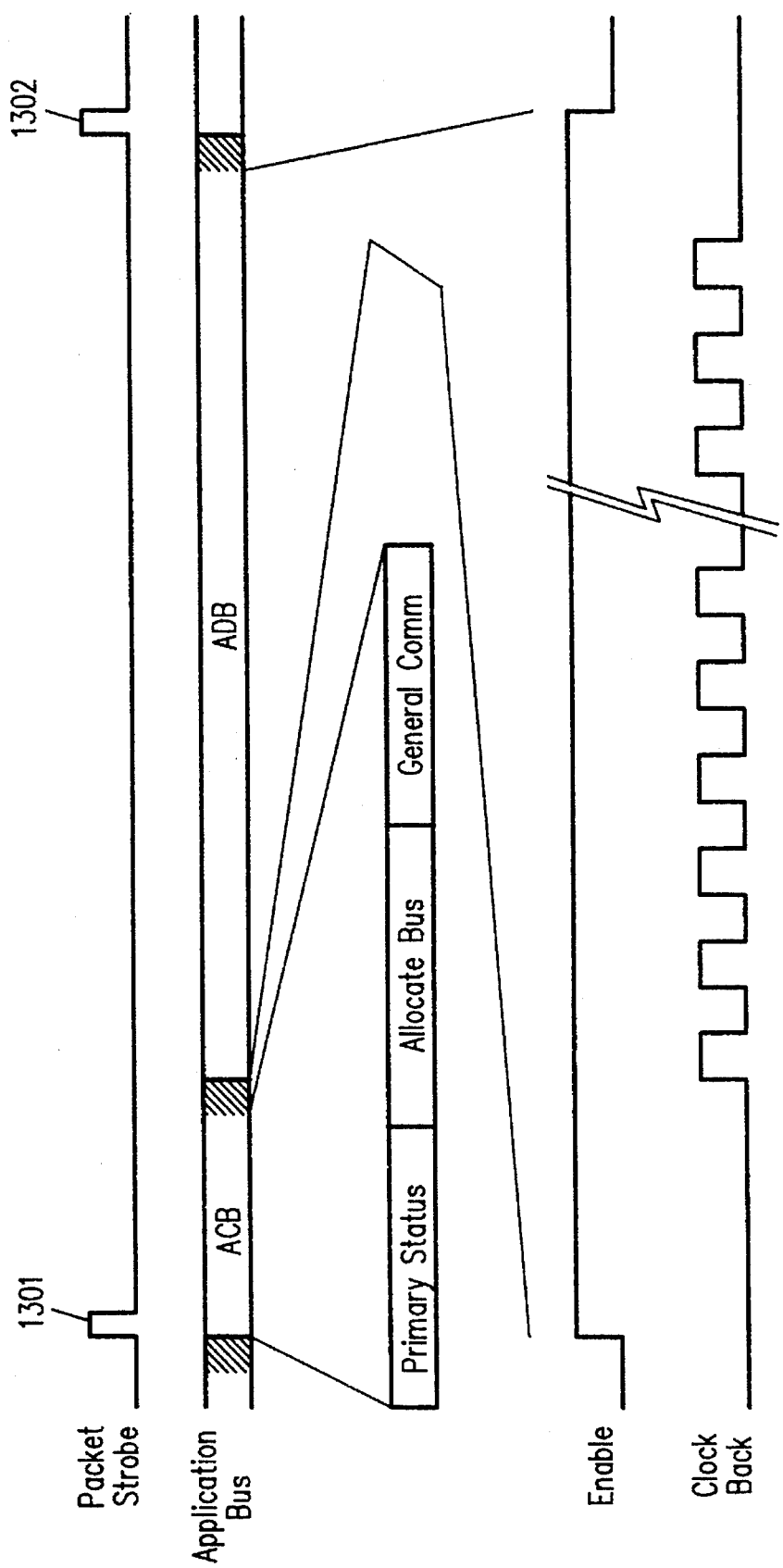
FIG. 13 is a timing diagram showing the two time intervals on the application bus within a packet time interval as well as the various message cycles within the first time interval.

As illustrated in FIG. 13, message cycle time interval ACB is sub-divided into three message cycles, i.e., primary status, allocate bus, and general communication cycles. Any of these three message cycles may be deleted from message cycle time interval ACB. However, any or all of the three cycles always occur in this order. There may be some unused portion of message cycle time interval ACB, especially if one or more message cycles are deleted. The three message cycles and their functions are further defined below.

At least one message cycle must precede each data transfer cycle to enable the data transfer. The number of message cycles that may occur between transfer cycles is limited by the required data transfer rate. With four message cycles between data transfers, and using a clock rate of approximately 12.5 MHz, the maximum transfer rate of application packet data on application control bus is 60 Mbits/sec.

Message cycle time interval ACB is determined by an ACB time counter 1242 (FIG. 12). ACB time counter 1242 is started in response to a packet strobe on line PS. ACB time counter 1242 then counts a predetermined number of application control bus clock ticks, e.g., 40 bus clock ticks, and generates an output signal.

Figure 14:
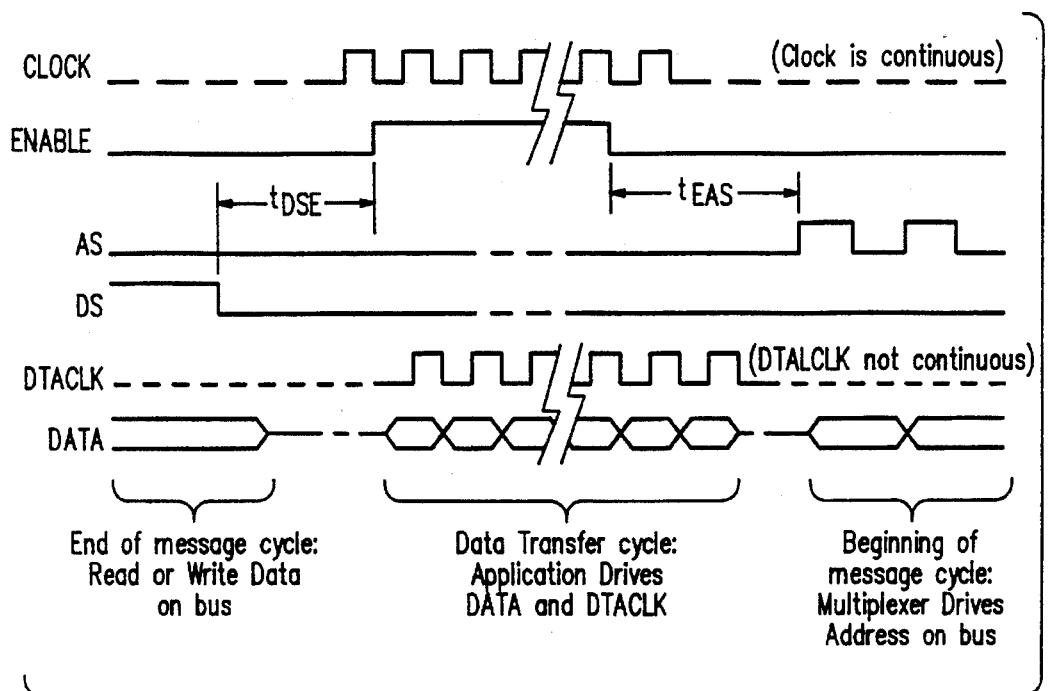
FIG. 14 is a timing diagram for operation of the statistical multiplexer that shows the timing relationship for data transfer over the application bus during the second portion of the packet time interval.

In response to the output signal of ACB time counter 1242, ACB state machine 311 drives data strobe signal low and sets signal ENABLE active after at least time tDSE (FIG. 14 and Table V). (Note in FIG. 13 signal ENABLE is expanded and lines are used to relate the rising and falling edge of signal ENABLE to time interval ADB on the application bus.) Hence, the data transfer protocol is controlled by the appropriate message cycles and signal ENABLE. A data transfer cycle requires that the selected application was already tasked, through a message cycle, to be the next application to provide packet data. During a message cycle, statistical multiplexer 300 enables an application 301-i to drive data bus DATA/ADR the next time signal ENABLE is asserted.

Application bus clock CLOCK (FIG. 14) runs continuously. ACB state machine 311 asserts and deasserts signal ENABLE (FIGS. 13 and 14) synchronous with application bus clock CLOCK. Signal ENABLE stays active for the number of application control bus clock ticks equal to the number of bytes in a data packet. In this embodiment, ADB time counter 1241 starts to count the number of application control bus clock ticks upon signal ENABLE going active. When ADB time counter 1241 has counted the requisite number of clock ticks, a signal is generated to ACB state machine 311, which in turn drives signal ENABLE inactive.

The enabled application drives data on bus DATA/ADR for the number of clock cycles that signal ENABLE is asserted. In this way statistical multiplexer 300 controls the number of bytes application 301-i sends on application control bus 360 in any one data transfer.

Application 301-i drives data onto bus DATA/ADR and a clock signal on line DTACLK synchronously. (FIG. 14.) The signal on line DTACLK is not required to be in phase with signal CLOCK, but the signal on line DTACLK must have the same frequency as signal CLOCK. Some latency is allowed from the time application 301-i received signal ENABLE until application 301-i drives the data clock signal DTACLK. See Table V. In this embodiment, application 301-i, once enabled, must assert DATA and DTACLK on bus 360 within two clock cycles of the first positive edge of the clock on which signal ENABLE goes active.

Application 301-i must drive the number of bytes on bus DATA/ADR as determined by the time interval signal ENABLE is active. This means the enable latency and disable latency must be the same for any application, but the latency time may vary from one application to the next. When ADB time counter 1241 times out following a data transfer, ACB state machine 311 drives the signal on line ENABLE inactive and statistical multiplexer 300 enables the next data transfer by appropriate message cycles. Specifically, statistical multiplexer 300 waits at least time tEAS (FIG. 14 and Table V) before asserting address strobe signal AS.

Figure 15:
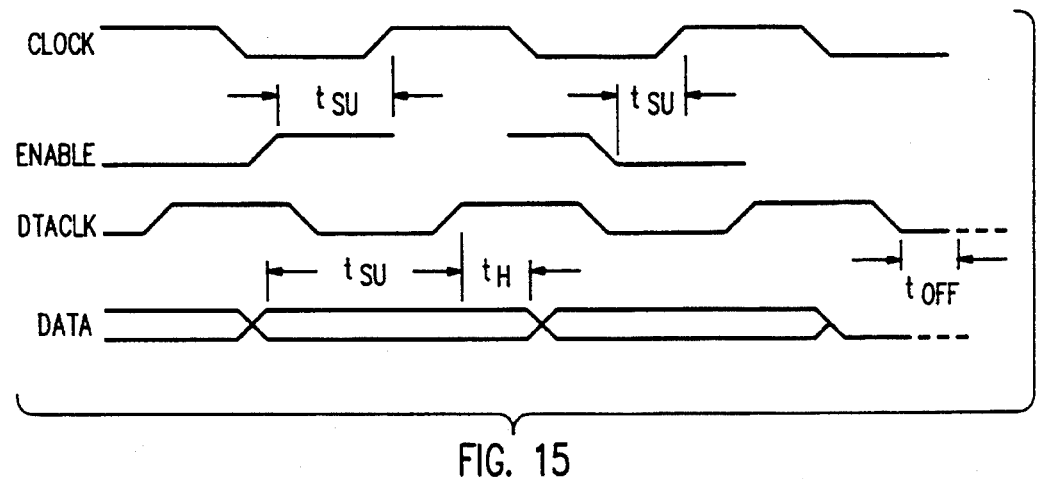
FIG. 15 is a timing diagram that shows the various relationships of the signals on the application bus when data is driven onto the application bus.

One embodiment of the timing relationships between the signals on lines CLOCK, ENABLE, DTACLK and bus DATA/ADR is presented in FIG. 15. Table V explains the interpretation of the set up time tSU, hold time tH and time off tOFF. Time tDSE (FIG. 14) is the minimum time statistical multiplexer 300 waits after data strobe signal DS is driven inactive.

TABLE V

| Parameter | Min/Max |
|---|---|
| tAL | Min 1 clock cycle |
| Application latency | Max 2 clock cycles |
| tSU | Min 15 nsec |
| Setup time for enable or data | |
| tH | Min 10 nsec |
| Hold time for data | |
| tOff | Min 2.0 nsec |
| Off time | |
| tDSE | Min 320 nsec |
| Off time | |
| tEAS | Min 480 nsec |
| Off time | |

Statistical multiplexer 300 counts the number of bytes sent over application control bus 360 with ADB byte counter 1240. In this embodiment, ADB byte counter 1240 is a down counter that generates a signal to ACB state machine 311 if and when the correct number of bytes have been received.

When an application 301-i is not driving line DTACLK, the driver for this line is set to a high impedance state by encoder 302-i. To avoid glitches on line DTACLK, encoder 302-i takes the driver to a logic zero state at least for time tOFF before disabling or enabling the driver. To disable the driver, encoder 302-i first puts a logic zero on line DTACLK and then disables the driver, i.e., the driver is set to the high impedance state. Bus terminations hold bus 360 in the logic zero state. When the next application 301-j enables its driver, there is not a transition on bus 360 because the drivers are enabled in the logic zero state.

As indicated above, ACB state machine 311 controls application control bus 360 using information stored in tables in memory 311. ACB state machine 311 causes the appropriate address generator 1222 to 1223 to address an entry in the appropriate table that contains information to control operation of application control bus 360 or to enable transfer of information from primary FIFO 1201 to bus 360. Entries in each of the stored tables controls one of the message cycles shown in FIG. 13.

Each of the tables have the same format for an entry. The first byte is a control byte that is used by ACB state machine 311. Table VI defines one embodiment of the control byte.

TABLE VI

| Name | Bit |
|---|---|
| Off | 0 |
| CF | 1 |
| Type | 3–2 |
| TF | 4 |
| BC | 5 |
| Reserved | 7–6 |

Bit Off is set if the table entry is not used.
Bit CF is not relevant to this invention.
The possible values for field Type are:
00 - Null packet inserted;
01 - Not used;
10 - Write to application control bus; and
11 - Read from application control bus When bit TF is set, a packet is read from a test FIFO. To use this feature bit Type must be set to "01". This feature is not required for operation of statistical multiplexer 300.

Bit BC is set to broadcast to all encoders on one of the application buses when doing general communications. The two least significant bits of the data byte in the general communication table designate which application bus, 0, 1, 2, or 3, to broadcast the data byte. The two least significant bits on data bus DATA/ADR are driven as logic zeros.

The reserved bits are always set to a logic zero.

Each encoder 302-i is addressed by an application address, that is sometimes referred to as a service channel identification SCID. Addresses on application control bus 360 are given by the second and third bytes in each table entry, with the most significant byte first. Within the sixteen bit address, the twelve most significant bits (bits 15-4) are the address for encoder 302-i. Other embodiments may use a different number of bits to address encoder 302-i. The next three bits (bits 3-1) are the address for specific registers within encoder 302-i. The last bit, i.e, the least significant bit, indicates read or write. The fourth byte in each table is a data byte. If a byte is written to an application 301-i during a message cycle, the information contained in the fourth byte of the entry table is provided to application 301-i. If a byte is read from an encoder 302-i, the byte is passed to microprocessor 312 by encoder 302-i writing to this location.

Figure 16:
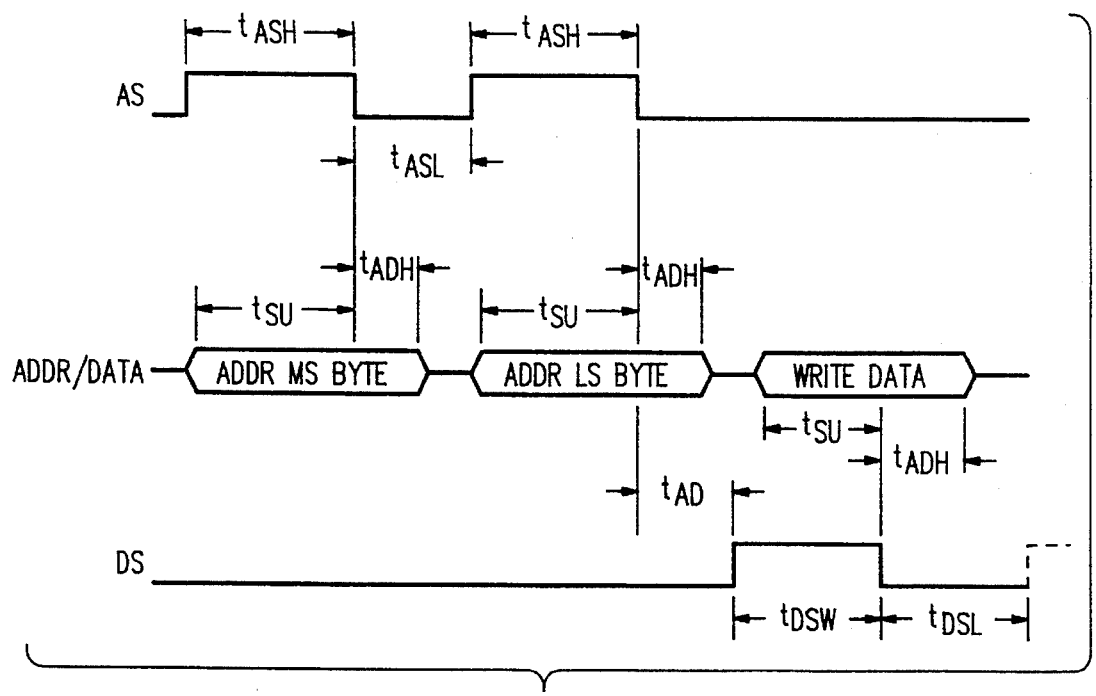
FIG. 16 is a timing diagram that shows the relationship between the various signals on the application bus when a byte is written during a message cycle.
Figure 17:
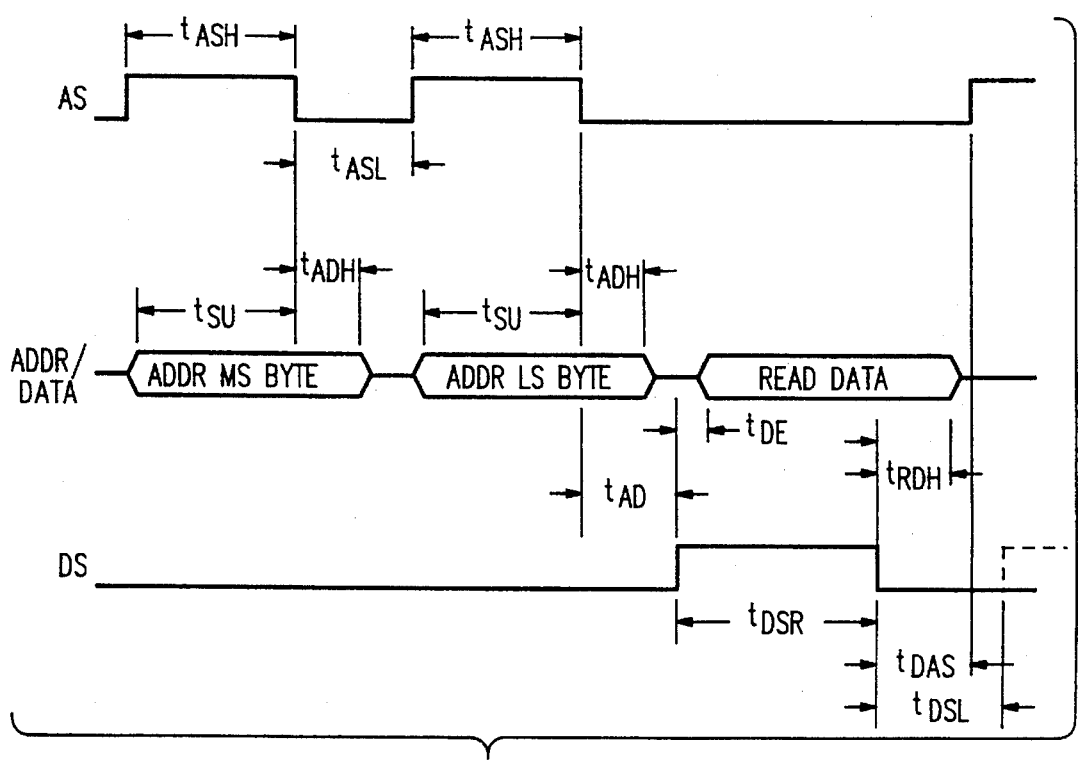
FIG. 17 is a timing diagram that shows the relationship between the various signals on the application bus when a byte is read during a message cycle.

The address bytes in a table are sent over bus DATA/ADR of application control bus 360 with consecutive pulses on address strobe line AS of application control bus. (FIGS. 14, 16 and 17.) Encoders 302-1 to 302-L latch the address bytes on the trailing edge of the pulse on address strobe line AS.

Reads and writes over bus DATA/ADR during a message cycle to the fourth byte in a table are enabled by a pulse on data strobe line DS of application control bus 360. (FIGS. 16 and 17.) During write transfers, data is latched by addressed encoder 302-i on the trailing edge of the pulse on data strobe line DS. During read transfers, ACB state machine latches data on the trailing edge of the pulse on data strobe line DS. When reading, there is no handshake for indicating that the read data is valid. This means data must be placed on application control bus 360 within a specified time of the signal on data strobe line DS being asserted. The various timing characteristics between the signals on lines AS, DS and bus DATA/ADDR, as shown in FIGS. 16 and 17, are defined in Table VII.

TABLE VII

| Parameter | Min/Max | Comment |
|---|---|---|
| tASL Address strobe low pulse width | Min 80 nsec | Applies only between the two strobes for the two address bytes. |
| tASH Address strobe high pulse width | Min 80 nsec | |
| tDSW Write data strobe pulse width | Min 160 nsec | Data Strobe signal DS is wider than address strobe signal AS to allow address decoding. |
| tDSR Read data strobe pulse width | Min 320 nsec | A long data strobe signal DS on read allows the application time to find the data and put it on bus DATA/ADR within bus 360. |

TABLE VII-continued

| Parameter | Min/Max | Comment |
|---|---|---|
| tDSL<br>Data strobe low<br>pulse width | Min 80 nsec | This timing characteristic applies between repeated writes or reads at the same address. |
| tAD<br>Address strobe to<br>data strobe setup | Min 80 nsec | This time interval allows the address to be latched before signal DS becomes valid, and so avoids false address decodes while the latched address is settling. |
| tSU<br>Address or data<br>setup | Min 40 nsec | Address or data is latched on falling edge. |
| tADH<br>Address or data<br>hold time | Min 40 nsec<br>Max 120 nsec | On read, data may not be put on the bus before signal DS is asserted. |
| tDE<br>Data enable<br>latency | Min 0 nsec<br>Max 120 nsec | On read, data must be driven on the bus until after signal DS is deasserted. |
| tRDH<br>Read data hold<br>time | Min 0 nsec<br>Max 120 nsec | After read, bus master allows time for bus to go inactive before asserting address for next cycle. |
| tDAS<br>Data strobe to<br>address delay | Min 320 nsec | |

As explained above, the primary table, which is defined at configuration time and is stored in memory 1207, divides a predetermined time interval into packet times. Each packet time in the predetermined time interval is allocated an entry into the primary table. Each entry in the primary table is an address that specifies which application 301-i is allocated this packet time. Since the primary table allocates bandwidth at a resolution down to one packet per second, the primary table, in one embodiment, has (39 Mbits/sec), the statistical multiplexer output rate, times (1/1024 packet/bits) or 29,297 entries.

As explained above, statistical multiplexer 300 shares responsibility with system supervisor 340 for building the primary table. After set-up, a pointer is set to the first entry in the primary table. Statistical multiplexer 300 uses one primary table entry every packet time and so the pointer to the primary table is indexed once for every packet period. Thus, packet time intervals over communication channel 330 are offered to applications 301-1 to 301-L according to the information in the primary table. Statistical multiplexer 300 actually provides for two primary tables. This allows statistical multiplexer 300 to build a "next" primary table and then switch to the next primary table, as described above.

As mentioned above the primary table is kept in DRAM 1207. At the appropriate time, a DMA transfer is used to move the addressed entry in the primary table from memory 1207 to primary FIFO 1201. After the last entry of the primary table is transferred to primary FIFO 1201, the DMA controller is redirected to the first entry of the primary table. This cycle is continued until a new primary table is built in another section of DRAM. The DMA controller is directed to this new primary table when desired.

During the primary status message cycle of a packet time, ACB state machine 311 reads the control word, i.e., the first byte, of the primary table entry pointed by the primary table pointer. If bit Off is set, the rest of the control word is ignored and the rest of this primary table entry is read and trashed and an entry in the secondary table is examined, as described below.

Field "Type" is used in primary table entries to define if this packet is a normal data packet or a system clock packet. If field Type field specifies that this packet is a system clock packet, the primary status message cycle is deleted and ACB state machine 311 moves onto the allocate bus message cycle and tells application 301-i, that received the previous packet interval that it gets this packet's bandwidth also.

If bit Off is not active and field Type is defined as a normal data packet, ACB state machine 311 performs a primary status message cycle. ACB state machine 311 performs a read at the encoder's address specified in the next two bytes of the entry. The data read at this address is a status that tells statistical multiplexer 300 if the addressed encoder wants this packet's bandwidth. If the addressed encoder declines this packet's bandwidth, the primary table entry's data byte is read and trashed.

If the addressed encoder returns a status that it wants this packet's bandwidth, the allocate bus message cycle provides directions to the addressed encoder to enable the encoder to use this packet's bandwidth.

The secondary table is used to allocate packets that are not allocated by the primary table. As indicated above, in one embodiment, only fixed rate applications are allocated in the primary table, and variable rate applications are allocated in the secondary table. Thus, when bit Off in the control word of the primary table is set, the secondary table is accessed.

In this case, ACB state machine 311 reads the control byte in the addressed entry of the secondary table. At initialization, a pointer is positioned at the first entry in the secondary table and after an entry is used, the pointer is incremented by ACB state machine 311. Specifically, ACB state machine 311 accesses the entries in the secondary table cyclically. ACB state machine 311 uses a counter to generate a pointer that cycles through the entries.

If bit Off is set in the addressed entry of the secondary table, packet assembly state machine inserts an idle packet in this packer's bandwidth, and the allocate bus message cycle is deleted. If bit Off bit is not set, ACB state machine 311 allocates this packet's bandwidth to the application listed in the next two bytes of this entry in the secondary table.

Figure 18:
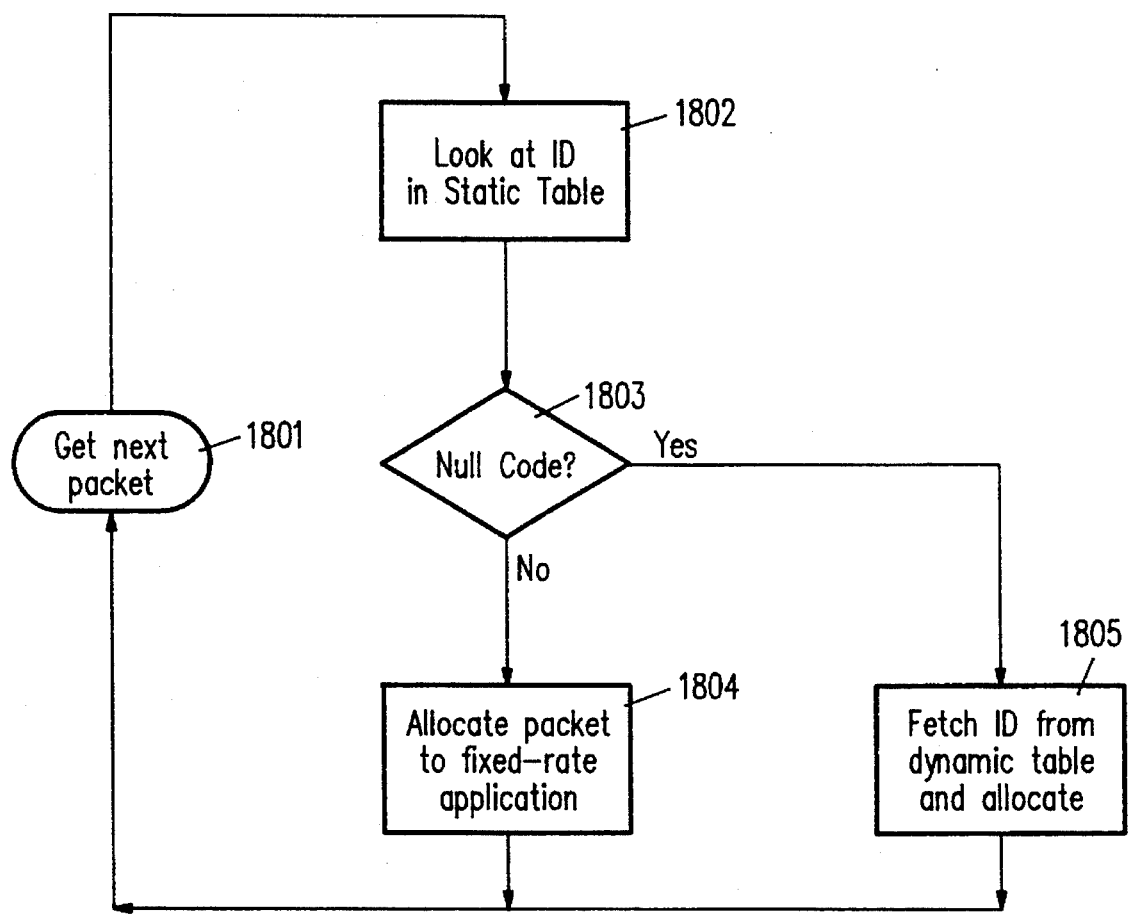
FIG. 18 is a process flow diagram that shows how the statistical multiplexer allocates each packet within a window to either a fixed rate application or a variable rate application.

Hence, the allocation of packets using the primary and secondary tables now becomes a two-tier approach. The flow for this process is illustrated in FIG. 18. ACB state machine 311 in step 1802 first examines the entry in primary FIFO 1201. If the current packet is allocated to a fixed rate application, the packet is offered to that application and the pointer for the primary table is advanced by one (modulo the total number of entries). However, if the packet is allocated to a variable rate application, as indicated by the null code in the primary table, null code check 1803 passes control to step 1805 and ACB state machine 311 checks the secondary table to see which variable rate application is allocated the current packet. After offering the packet to the variable rate application, the pointers for both the primary and secondary tables are advanced by one (modulo their respective total number of entries).

There are two secondary tables resident in shared memory 1202. This allows ACB state machine 311 to use one table while microprocessor 312 builds a second. As described above, a bit in the ACB state machine control register, which is controlled by microprocessor 312, controls which secondary table ACB state machine 311 accesses.

The last message cycle in message cycle interval ACB of a packet time is for general communications between statistical multiplexer 300 and applications 302-1 to 320-L. This table is built by microprocessor 312 and kept in shared memory 1203.

ACB state machine 311 accesses the entries in the general communications table cyclically by using a counter to generate a pointer that cycles through the entries. ACB state machine 311 deletes the general communications message cycle whenever an entry has bit Off set. The general communications table entry pointer remains at this entry until microprocessor 312 writes to the ACB state machine control register to send more general communication bytes. The ACB state machine generates an interrupt when it reaches a general communications table entry with bit Off set.

In the general communications message cycle, ACB state machine 311 either reads a byte from the addressed application and puts the byte into the data byte field of the general communication table entry, or reads the general communication table entry data byte field and writes this byte to the application. The data direction is controlled by field Type of the entry.

There are two general communications tables resident in shared memory 1204. This allows ACB state machine 311 to use one table while microprocessor 312 builds a second. A bit in the ACB state machine control register, which is controlled by microprocessor 312, controls which table ACB state machine 311 accesses.

During a data transfer in the general communications message cycle, data strobe signal DS may be asserted multiple times. This allows reading and writing from registers with more than one 8-bit byte. Multiple-byte registers use subsequent data strobes for successive bytes of the register, beginning with the least significant byte. Thus, to write to a 16-bit register, the bus master asserts data strobe signal DS twice, the first time with the least significant byte of data, and the second with the most significant byte of data. Reading the register is done in the same way. Registers are organized so that the bus master may optionally read or write only the least significant byte(s). There is technically no limit to the number of bytes a register may have. Thus, a memory could be treated as a register, doing multiple byte reads or writes.

Microprocessor 312 in statistical multiplexer 300 communicates with system supervisor 340 over a system supervisor bus. As explained above for step 401, statistical multiplexer 300 is configured and controlled by system supervisor 340. The information is passed between statistical multiplexer 300 and system supervisor 340 over using High Level Data Link Communication protocols. The particular bus structure used to form a communication path between statistical multiplexer 300 and system supervisor 340 is not a part of the current invention. The important aspect is the information provided by system supervisor 340 to statistical multiplexer 300. The particular mode used to transport the information to statistical multiplexer 300 is defined by configuration of the system supervisor 340 and so will be known when the statistical multiplexer is configured with a particular system supervisor.

As indicated in step 401, statistical multiplexer 300 system supervisor tells statistical multiplexer 300 which applications 301-i to 301-L are in the system and how applications 301-2 to 301-L are configured. System supervisor 340 also provides a method of updating statistical multiplexer software. In this embodiment, statistical multiplexer 300 software revisions are downloaded over system supervisor bus to statistical multiplexer 300 and stored in non-volatile flash memory 1206.

The above hardware description is illustrative only of one embodiment of the invention. In view of this disclosure, the tables and data used by statistical multiplexer as well as communications with the encoders, communication channel, and system supervisor can be implemented in a wide variety of ways. In addition, as noted earlier, the use of the statistical multiplexer for compressed video data is illustrative only. The statistical multiplexing principles of this invention, in view of this disclosure, can be used by those skilled in the art for a wide variety of data streams.

I claim:

1. A statistical multiplexing process for a plurality of data streams competing for access to a communication channel comprising the steps of:
   a) populating a static table in a memory of a statistical multiplexer wherein said static table has an entry for each unit of data that can be sent over said communication channel in a predetermined time period wherein said static table populating step further comprises;
      i) allocating an entry in said static table to one of said plurality of data streams;
      ii) storing a predetermined code in said entry if said entry is allocated to a data stream that has a variable rate;
      iii) storing a pointer in said entry if said entry is allocated to a data stream that has a fixed rate wherein said pointer identifies the fixed rate data stream; and
      iv) repeating steps i) to iii) for each entry in said static table; and
   b) using each table entry in said static table in selecting the data stream in said plurality of data streams that sends the next unit of data to the communication channel.

2. The statistical multiplexing process of claim 1 further comprising the step of:
   populating a dynamic table wherein said dynamic table populating step further comprises:
      i) allocating an entry in said dynamic table to one of A) one of a plurality of variable rate data streams in said plurality of data streams and B) a variable rate data stream of idle units of data;
      ii) storing in said entry a pointer to said variable rate data stream upon allocation of said entry to said variable rate data stream; and
      iii) repeating steps i) to ii) for each entry in said dynamic table.

3. The statistical multiplexing process of claim 2 wherein said step of using each entry in said static table further comprises:
   accessing an entry in said dynamic table, upon detecting an entry in said static table containing said predetermined code, to select the variable rate data stream that sends the next unit of data to the communication channel.

4. The statistical multiplexing process of claim 3 further comprising the step of:
   adjusting a number of units of data allocated for transmission over said communication channel for each of said variable rate data streams that has a quality measurement parameter outside a predetermined range.

5. The statistical multiplexing process of claim 4 further comprising the step of:

populating a second dynamic table using said adjusted number of units of data allocated for transmission over said communication channel wherein said second dynamic table populating step further comprises:
i) allocating an entry in said second dynamic table to one of A) one of said plurality of variable rate data streams in said plurality of data streams and B) a variable rate data stream of idle units of data;
ii) storing in said entry a pointer to said variable rate data stream upon said entry being allocated to said variable rate data stream; and
iii) repeating steps i) to ii) for each entry in said second dynamic table.

6. The statistical multiplexing process of claim 5 further comprising the step of:
switching from said dynamic table to said second dynamic table so that said second dynamic table is available for use in another predetermined time window following a predetermined time window in which said dynamic table is used.

7. The statistical multiplexing process of claim 2 wherein said step of populating a dynamic table is done once in a predetermined time window.

8. The statistical multiplexing process of claim 3 further comprising the step of:
collecting data for each variable rate data stream to generate a parameter that characterizes said variable rate data stream.

9. The statistical multiplexing process of claim 8 further comprising the step of:
generating for each variable rate data stream said parameter that characterizes said variable rate data stream.

10. The statistical multiplexing process of claim 8 wherein said parameter comprises a measure of distortion.

11. The statistical multiplexing process of claim 9 further comprising the step of:
adjusting a number of units of data allocated for transmission over said communication channel for each of said variable rate data streams with said parameter outside a predetermined range.

12. The statistical multiplexing process of claim 11 wherein a lower limit of said predetermined range is a product of a first hysteresis coefficient and a distortion parameter.

13. The statistical multiplexing process of claim 11 wherein an upper limit of said predetermined range is a product of a second hysteresis coefficient and a distortion parameter.

14. The statistical multiplexing process of claim 11 further comprising the step of:
populating a second dynamic table using said adjusted number of units of data allocated for transmission over said communication channel for each of said variable rate data streams wherein said second dynamic table populating step further comprises:
i) allocating an entry in said second dynamic table to one of A) one of said plurality of variable rate data streams in said plurality of data streams and B) a variable rate data stream of idle units of data;
ii) storing in said entry a pointer to said variable rate data stream upon said entry being allocated to said variable rate data stream; and
iii) repeating steps i) to ii) for each entry in said second dynamic table.

15. The statistical multiplexing process of claim 14 further comprising, the step of:
switching from said dynamic table to said second dynamic table so that said second dynamic table is available for use in another predetermined time window following a predetermined time window in which said dynamic table is used.

16. The statistical multiplexing process of claim 3 wherein said plurality of data streams includes an encoded video data stream.

17. A statistical multiplexing process for a plurality of encoded data streams sharing access to a communication channel comprising the steps of:
assigning a rate to each variable rate encoder that generates one of said plurality of encoded data streams, and to each fixed rate encoder that generates one of said plurality of encoded data streams;
populating a table having a predetermined number of entries using said assigned rates
wherein each entry in said table is allocated to one of
(i) one of said plurality of encoded data streams and
(ii) a variable rate data stream of idle packets; and
using each table entry in said table to select an encoded data stream that sends the next packet to the communication channel.

18. The statistical multiplexing process of claim 17 wherein said assigning a rate step is performed in an initialization step and each fixed rate encoder is assigned an actual rate and each variable rate encoder is assigned a guaranteed rate.

19. The statistical multiplexing process of claim 18 wherein in said initialization step, each variable rate encoder is assigned a distortion threshold.

20. The statistical multiplexing process of claim 18 wherein said step of populating a table further comprises:
i) storing a predetermined code in said entry if said entry is allocated to an encoded data stream that has a variable rate;
ii) storing a pointer in said entry if said entry is allocated to an encoded data stream that has a fixed rate wherein said pointer identifies the fixed rate data stream; and
iii) repeating steps i) to ii) for each entry in said table.

21. The statistical multiplexing process of claim 20 further comprising the step of:
populating a second table wherein said second table populating step further comprises:
i) allocating an entry in said second table to one of A) one of a plurality of variable rate encoded data streams in said plurality of encoded data streams and B) a variable rate data stream of idle packets;
ii) storing in said entry a pointer to said variable rate encoded data stream upon said entry being allocated to said variable rate encoded data stream; and
iii) repeating steps i) and ii) for each entry in said second table.

22. The statistical multiplexing process of claim 21 wherein said step of using each entry in said first-mentioned table further comprises:
accessing an entry in said second table, upon detecting an entry in said first-mentioned table containing said predetermined code, to select the variable rate data stream that sends the next packet to the communication channel.

23. The statistical multiplexing process of claim 21 further comprising the step of:
collecting data for each variable rate encoded data stream from a variable rate encoder to generate a distortion parameter that characterizes said variable rate encoded data stream from said variable rate encoder.

24. The statistical multiplexing process of claim 23 further comprising the step of:

generating said distortion parameter that characterizes a quality of said variable rate encoded data stream.

25. The statistical multiplexing process of claim 24 further comprising the step of:

adjusting a number of packets allocated to each of said variable rate encoded data streams using said distortion parameter if said distortion parameter is outside a predetermined range.

26. The statistical multiplexing process of claim 25 wherein a lower limit of said predetermined range is a product of a first hysteresis coefficient and a distortion threshold.

27. The statistical multiplexing process of claim 25 wherein an upper limit of said predetermined range is a product of a second hysteresis coefficient and a distortion threshold.

28. The statistical multiplexing process of claim 25 further comprising the step of:

populating a third table using said adjusted number of packets allocated for transmission over said communication channel wherein said third table populating step further comprises:
i) allocating an entry in said third table to one of A) one of said plurality of variable rate encoded data streams in said plurality of encoded data streams and B) a variable rate data stream of idle packets;
ii) storing in said entry a pointer to said variable rate encoded data stream upon said entry being allocated to said variable rate data stream; and
iii) repeating steps i) to ii) for each entry in said third table.

29. The statistical multiplexing process of claim 28 further comprising the step of:

switching from said second table to said third table so that said third table is available for use in another predetermined time window following a predetermined time window in which said second table is used.

30. The statistical multiplexing process of claim 21 wherein said plurality of data streams includes an encoded video data stream.

31. A statistical multiplexing process for a plurality of encoded data streams sharing a communication channel comprising the steps of:

collecting data for each variable rate encoded data stream from a variable rate encoder in said plurality of encoded data streams to generate a distortion parameter that characterizes said variable rate encoded data stream;

generating for each variable rate encoded data stream said distortion parameter that characterizes a quality of said variable rate encoded data stream;

adjusting a number of packets allocated to each of said variable rate encoded data streams in a selected time period if said distortion parameter is outside a predetermined range;

populating a table using said adjusted number of allocated packets wherein said table populating step further comprises:
i) allocating an entry in said table to one of A) a variable rate encoded data stream in a plurality of variable rate encoded data streams that are included in said plurality of encoded data streams and B) a variable encoded data stream of idle packets;
ii) storing in said entry a pointer to said variable rate encoded data stream upon said entry being allocated to said variable rate encoded data stream; and
iii) repeating steps i) to ii) for each entry in said table;

switching to said table so that said table is used by a statistical multiplexer to determine the variable rate encoded data stream that sends the next packet to said communication channel.

* * * * *